US008948323B2

(12) United States Patent
Cheng et al.

(10) Patent No.: US 8,948,323 B2
(45) Date of Patent: Feb. 3, 2015

(54) METHOD AND DEVICE FOR SUPPRESSING INTERFERENCE IN COMMUNICATION NETWORKS USING FREQUENCY SWITCHED TRANSMIT DIVERSITY CODING

(71) Applicant: Telefonaktiebolaget L M Ericsson (publ), Stockholm (SE)

(72) Inventors: Jung-Fu Cheng, Fremont, CA (US); Sorour Falahati, Stockholm (SE); Mattias Frenne, Uppsala (SE); Yi-Pin Eric Wang, Fremont, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 167 days.

(21) Appl. No.: 13/646,338

(22) Filed: Oct. 5, 2012

(65) Prior Publication Data
US 2013/0114755 A1      May 9, 2013

Related U.S. Application Data

(60) Provisional application No. 61/544,153, filed on Oct. 6, 2011.

(51) Int. Cl.
| | | |
|---|---|---|
| H03D 1/04 | (2006.01) | |
| H03D 1/06 | (2006.01) | |
| H03K 5/01 | (2006.01) | |
| H03K 6/04 | (2006.01) | |
| H04B 1/10 | (2006.01) | |
| H04L 1/00 | (2006.01) | |
| H04L 25/08 | (2006.01) | |

(Continued)

(52) U.S. Cl.
CPC ............ H04B 7/0456 (2013.01); H04B 7/0854 (2013.01)

USPC .......................................................... 375/346

(58) Field of Classification Search
CPC .................. H04B 1/712; H04B 2201/709727; H04B 1/7103; H04B 7/0626; H04B 7/0417; H04L 25/0224
USPC .......................................................... 375/346
See application file for complete search history.

(56) References Cited

U.S. PATENT DOCUMENTS

2007/0047629 A1*  3/2007  Fulghum ....................... 375/148
2010/0080112 A1*  4/2010  Bertrand et al. ............. 370/208

OTHER PUBLICATIONS

International Preliminary Report on Patentability, issued in corresponding International Application No. PCT/IB2012/055403, dated Apr. 8, 2014, 13 pages.

(Continued)

*Primary Examiner* — Tanmay Shah
(74) *Attorney, Agent, or Firm* — Rothwell, Figg, Ernst & Manbeck, P.C.

(57) ABSTRACT

Devices and methods for suppressing interference in intercell and intra-cell network communication. First and second received signals are received at a communication device, the first and second received signals comprising, respectively, reference signals and data signals. Estimated channel vectors are calculated from the first received signals, and estimated data covariance matrices are calculated from the second received signals. A plurality of combining weight vectors are determined based on the estimated channel vectors and the estimated data covariance matrices. The second received signals are then combined with the plurality of combining weight vectors to obtain a plurality of combined signals, wherein interference in the second received signals has been suppressed in the plurality of combined signals.

82 Claims, 18 Drawing Sheets

(51) Int. Cl.
*H04B 7/04* (2006.01)
*H04B 7/08* (2006.01)

(56) References Cited

OTHER PUBLICATIONS

Renesas Mobile Europe Ltd: "Interference aware receiver modeling at system level", 3GPP Draft; R1-111562, 3rd Generation Partnership Project (3GPP), Mobile Competence Centre ; 650, Route Des Lucioles ; F-06921 Sophia-Antipolis Cedex ; France, vol. RAN WG1, No. Barcelona, Spain; May 9-13, 2011, XP050491209.

Alexander Maltsev et al: "Comparative Analysis of Spatial Covariance Matrix Estimation Methods in OFDM Communication Systems", Signal Processing and Information Technology, 2006 IEEE International Symposium on, IEEE, PI, Aug. 1, 2006, pp. 551-555, XP031002490, ISBN: 978-0-7803-9753-8.

Cristina Ciochina et al: "Mapping techniques for transmit diversity precoding in SC-FDMA systems with four transmit antennas", IEEE 20th International Symposium on Personal, Indoor and Mobile Radio Communications (PIMRC 2009), IEEE, Piscataway, NJ, USA, Sep. 13, 2009, pp. 2504-2508, XP031659601, ISBN: 978-1-4244-5122-7.

* cited by examiner

METHOD AND DEVICE FOR SUPPRESSING INTERFERENCE IN COMMUNICATION NETWORKS USING FREQUENCY SWITCHED TRANSMIT DIVERSITY CODING

CROSS-REFERENCE TO RELATED APPLICATION

This application claims priority to U.S. Provisional Application No. 61/554,153, filed Oct. 6, 2011 and entitled "Robust Receiver Methods and Apparatus for DFT-Precoded Control Channels with Transmit Diversity," the disclosure of which is incorporated herein in its entirety by reference.

TECHNICAL FIELD

The present invention relates generally to improving data transmission in communication networks, and more particularly, to a method and device for suppressing interference in communication networks using frequency switched transmit diversity coding.

BACKGROUND

3GPP Long Term Evolution (LTE) is a standard for mobile phone network technology. LTE is a set of enhancements to the Universal Mobile Telecommunications System (UMTS), and is a technology for realizing high-speed packet-based communication that can reach high data rates on both downlink and uplink channels. As illustrated in FIG. 1, LTE transmissions are sent from base stations 102, such as Node Bs (NBs) and evolved Node Bs (eNBs) in a telecommunication network 106, to mobile stations 104 (e.g., user equipment (UE)). Examples of wireless UE communication devices include mobile telephones, personal digital assistants, electronic readers, portable electronic tablets, personal computers, and laptop computers.

The LTE standard is primarily based on Orthogonal Frequency Division Multiplexing (OFDM) in the downlink, which splits the signal into multiple parallel sub-carriers in frequency, and Single Carrier Frequency Domain Multiple Access (SC-FDMA) in the uplink. A transmit time interval (TTI) is the basic logical unit. A radio resource element (RE) is the smallest addressable location within a TTI, corresponding to a certain time location and a certain frequency location. For instance, as illustrated in FIG. 2, a sub-frame 200 comprised of REs 202 may be transmitted in a TTI in accordance with the LTE standard, and may comprise sub-carriers 204 in the frequency domain. In the time domain, the sub-frame may be divided into a number of OFDM (or SC-FDMA) symbols 208. An OFDM (or SC-FDMA) symbol 208 may include a cyclic prefix 206. Thus, the unit of one sub-carrier and one symbol is a resource unit or element 202.

Long Term Evolution (LTE) systems use Orthogonal Frequency Division Multiple access (OFDM) in the downlink to the communication device and DFT-spread OFDM, which is referred to as single-carrier FDMA (SC-FDMA), in the uplink to the base station or node. The basic LTE downlink physical resource can be viewed as a time-frequency grid as illustrated in FIG. 2, where each resource element 202 corresponds to one OFDM subcarrier 204 during one OFDM symbol interval.

In the time domain, LTE downlink transmissions are organized into radio frames 602 of 10 ms, each radio frame comprising ten equally-sized subframes 604 of length $T_{subframe}=1$ ms, as shown in FIG. 6. The resource allocation in LTE is typically described in terms of resource blocks, where a resource block corresponds to one slot (0.5 ms) in the time domain and 12 contiguous subcarriers in the frequency domain. Resource blocks are numbered in the frequency domain, starting with 0 from one end of the system bandwidth.

Wireless communication systems may be deployed in a number of configurations, such as Multiple-Input, Multiple-Output (MIMO) radio systems. An exemplary MIMO system including a base station 302, such as an eNB 302, and user equipment 304 is shown in FIG. 3. When a signal is transmitted by the eNB 302 in a downlink, i.e., the link carrying transmissions from the eNB to the UE 304, a sub-frame may be transmitted from multiple antennas 306, 308 and the signal may be received at UE 304, which has one or more antennas. The radio channel distorts the transmitted signals from the multiple antenna ports. UE 304 may use receiver-diversity signal processing schemes to improve performance.

In an LTE system, transmissions intended for a first user are often overheard by a second, unintended user. The second user may utilize overheard data packets in various ways.

Downlink transmissions are dynamically scheduled. I.e., in each subframe 602, the base station transmits control information about which terminals to which data is transmitted and upon which resource blocks the data is transmitted, in the current downlink subframe. This control signaling is typically transmitted in the first 1, 2, 3 or 4 OFDM symbols in each subframe 602. A downlink system with 3 OFDM symbols as control is illustrated in FIG. 7, where the control region is shown at 702, exemplary OFDM control signal symbols are shown at 704, and exemplary reference symbols are shown at 706.

LTE uses Hybrid Automatic Repeat Request (HARQ), where, after receiving downlink data in a subframe, the terminal, or communication device, attempts to decode it and reports to the base station whether the decoding was successful (Acknowledgement—ACK) or not (Non-Acknowledgement—NACK). In the event of an unsuccessful decoding attempt, the base station can retransmit the erroneous data.

Uplink control signaling from the terminal to the base station includes of hybrid-ARQ acknowledgements for received downlink data; terminal reports related to the downlink channel conditions, used as assistance for the downlink scheduling; and scheduling requests, indicating that a mobile terminal needs uplink resources for uplink data transmissions.

If the mobile terminal has not been assigned an uplink resource for data transmission, the L1/L2 control information (channel-status reports, hybrid-ARQ acknowledgments, and scheduling requests) is transmitted in uplink resources (resource blocks) specifically assigned for uplink L1/L2 control on Rel-8 Physical Uplink Control Channel (PUCCH). As illustrated in FIG. 8, these resources are located at the edges of the total available cell bandwidth. Each such resource comprises 12 "subcarriers" 802 (one resource block) within each of the two slots 804 of an uplink subframe. In order to provide frequency diversity, these frequency resources are frequency hopping on the slot boundary, i.e. one "resource" includes 12 subcarriers 802 at the upper part of the spectrum within the first slot of a subframe and an equally sized resource at the lower part of the spectrum during the second slot of the subframe or vice versa. If more resources are needed for the uplink L1/L2 control signaling, e.g. in case of very large overall transmission bandwidth supporting a large number of users, additional resource blocks can be assigned next to the previously assigned resource blocks.

The reasons for locating the PUCCH resources at the edges of the overall available spectrum are two-fold. Together with the frequency hopping described above, this maximizes the frequency diversity experienced by the control signaling. Assigning uplink resources for the PUCCH at other positions within the spectrum, i.e. not at the edges, would fragment the uplink spectrum, making it impossible to assign very wide transmission bandwidths to a single mobile terminal and still retain the single-carrier property of the uplink transmission.

The bandwidth of one resource block during one subframe is too large for the control signaling needs of a single terminal. Therefore, to efficiently exploit the resources set aside for control signaling, multiple terminals can share the same resource block. This can be accomplished by assigning the different terminals different orthogonal phase rotations of a cell-specific length-12 frequency-domain sequence and/or different orthogonal time-domain covers covering the subframes within a slot or subframe.

When carrier aggregation is used in LTE, one uplink carrier is designed to carry the HARQ-ACK/NACK (A/N) bits for all DL carrier Physical Downlink Shared Channel (PDSCH) transmissions. To enable the possibility to transmit more than four bits of A/N, PUCCH format 3 can be used, as disclosed in 3GPP TS 36.211. The basis for Format 3 is DFT-precoded OFDM, as shown in FIG. 9. There are ten SC-FDMA symbols for carrying data and four SC-FDMA symbols for carrying reference signals (RS).

If the number of ACK/NACK bits is up to eleven, then the multiple ACK/NACK bits (which may also include scheduling request (SR) bits) are Reed-Müller (RM) encoded to form 48 coded bits. The coded bits are then scrambled with cell-specific sequences. 24 bits are transmitted within the first slot and the other 24 bits are transmitted within the second slot. The 24 bits per slot are converted into twelve Quadrature Phase-Shift Keying (QPSK) symbols, spread across five DFTS-OFDM symbols using an Orthogonal Cover Code (OCC), applied with cyclic shifts (CS), DFT precoded and transmitted within one resource blocks (bandwidth) and five DFTS-OFDM symbols (time). The spreading sequence is user equipment (UE)-specific and enables multiplexing of up to five users within the same resource blocks.

For the reference signals cyclic shifted, Constant Amplitude Zero Auto Correlation (CAZAC) sequences, e.g. the computer optimized sequences disclosed in 3GPP TS 36.211, are used. To improve orthogonality among reference signals even further, an orthogonal cover code of length two can be applied to the reference signals, but this is not used in LTE Rel. 10. If the number of ACK/NACK bits exceeds eleven, then the bits are split into two parts and two RM encoders are used, one for each part respectively, as disclosed in 3GPP TS 36.212. This is known as the dual-RM code. Up to twenty ACK/NACK bits (plus one SR bit) can therefore be supported by PUCCH Format 3. Each encoder in the dual-RM code outputs twenty-four bits, which are converted to six QPSK symbols per slot. The two sets of six QPSK symbols are interleaved over the subcarriers so that the first encoder maps its six symbols onto odd subcarriers and the second encoder onto even subcarriers. These twelve QPSK symbols are then spread across the five DFTS-OFDM symbols using one out of five orthogonal cover codes, as in the single-RM code case.

Details of the encoding and multiplexing are shown in FIGS. 10(a) and 10(b), where the following algorithm is used in the Dual Codeword Combiner 1016 operation in which $\tilde{b}_0, \tilde{b}_1, \tilde{b}_2, \ldots, \tilde{b}_{23}$ is the output sequence from the first encoder 1012; and $\tilde{\tilde{b}}_0, \tilde{\tilde{b}}_1, \tilde{\tilde{b}}_2, \ldots, \tilde{\tilde{b}}_{23}$ is the output sequence from the second encoder 1210, where $N_{sc}^{RB}=12$, the number of subcarriers per resource block.

The output bit sequence $b_0, b_1, b_2, \ldots, b_{B-1}$ where $B=4 \cdot N_{sc}^{RB}$ is obtained by the alternate concatenation of the bit sequences $\tilde{b}_0, \tilde{b}_1, \tilde{b}_2, \ldots, \tilde{b}_{23}$ and $\tilde{\tilde{b}}_0, \tilde{\tilde{b}}_1, \tilde{\tilde{b}}_2, \ldots, \tilde{\tilde{b}}_{23}$ as follows:

Set i, j=0
while $i<4 \cdot N_{sc}^{RB}$
$b_i = \tilde{b}_j, b_{i+1} = \tilde{b}_{j+1}$
$b_{i+2} = \tilde{\tilde{b}}_j, b_{i+3} = \tilde{\tilde{b}}_{1+1}$
i=i+4
j=j+2
end while FIG. 10(a) is a flow chart illustrating the details of encoding and multiplexing up to eleven UCI bits. FIG. 10(b) shows the process for encoding and multiplexing from twelve to twenty-one UCI bits in Rel-10. It should be noted that in the "map to . . . " operation in FIGS. 10(a), 10(b), and 11, a cell, slot, and symbol-specific cyclic shift of the symbols in time domain is included to provide inter-cell interference randomization. Additional details are set forth in the LTE standard specification, 3GPP TS 36.211.

In Rel-10, multiple transmit antennas for the UE were introduced to LTE. For the uplink data channels, multiple transmit antennas allow transmission schemes achieving enhanced reliability in the form of transmit diversity coding or enhanced user data rates in the form of spatial multiplexing. In Rel-10, a transmit diversity referred to as the Space Orthogonal Transmit Diversity (SORTD) was introduced for the PUCCH Format 3. Under the SORTD scheme, the same PUCCH Format 3 signal is transmitted by the UE on multiple transmit antenna ports using different PUCCH Format 3 resources (with different OCC on the coded QPSK symbols and different cyclic shifts for the reference symbols). An improved transmit diversity design based on frequency switched transmit diversity was under investigation for PUCCH Format 3 in Rel-11. The advantage of the frequency switched transmit diversity is that only one PUCCH Format 3 resource (one OCC on the coded QPSK symbols and one cyclic shift for the reference symbols) is consumed even for multiple transmit antenna ports.

FIG. 11(a) is a flow chart illustrating the details of encoding and multiplexing of the frequency switched transmit diversity scheme for up to eleven UCI bits, and FIG. 11(b) is a flow chart illustrating those for twelve to twenty-two UCI bits. The frequency switched transmit diversity for the PUCCH Format 3 is designed to transmit the coded QPSK symbols on different antenna ports using nonoverlapping subcarriers. For the exemplary cases of two transmit antenna ports illustrated in FIGS. 11(a) and 11(b), coded QPSK symbols to be transmitted on antenna port 0 occupy only the even-indexed subcarriers, and those to be transmitted on antenna port 1 occupy only the even-indexed subcarriers.

For signals of simple structures, standard solutions based on Minimum Mean Square Error (MMSE) principles can be applied to suppress the interfering signals. However, for frequency switched transmit diversity coding, such as, for example, the PUCCH Format 3 with frequency-switched transmit diversity coding, standard MMSE solutions cannot achieve proper suppression of interfering signals.

Based on the parameters provided below, the $n_R \times n_R$ interference covariance matrix according to a standard receiver algorithm has been estimated as $$\hat{M}_s = \frac{1}{24} \sum_{k=0}^{1} \sum_{i=0}^{11} [r(i,k) - s_0(i,k)\hat{h}_0 - s_1(i,k)\hat{h}_1][r(i,k) - s_0(i,k)\hat{h}_0 - s_1(i,k)\hat{h}_1]^H, \quad \text{EQ 1}$$

where $x^H$ denotes the conjugate transpose of the vector x. This result can be then combined with estimated channel vectors to form the combining weight vectors:

$$w_p = (\hat{h}_p \hat{h}_p^H + \hat{M}_s)^{-1} \hat{h}_p, \quad \text{EQ 2:}$$

For p=0 and 1.

The main components of interference covariance matrix estimate have been expressed as:

$$\hat{M}_s \approx g_0 g_0^H + g_1 g_1^H + \Lambda, \quad \text{EQ 3:}$$

where $g_p$ is the channel from the pth antenna of the inter-cell interfering UE. Hence, this covariance matrix estimate contains interference powers from both transmit antennas of the interfering UE device. However, each data signal received from the desired UE device is interfered by signals originated from only one transmit antenna of the interfering UE device. Therefore, the combining weight shown in EQ 2 does not match to the received data signal structure. Applying such mismatched combining weight vectors in the receiver leads to inferior reception performance.

Accordingly, there is a need to suppress interference that may be caused by signals from, for example, inter-cell UE devices and intra-cell UE devices in communication networks, for example, using frequency switched transmit diversity coding.

SUMMARY

Particular embodiments are directed to devices and methods for improving performance by suppressing interference in a communication network that includes a plurality of transmit antennas and a plurality of user devices.

According to one particular embodiment, a method for suppressing interference in a communication network including a plurality of communication devices is provided. The method includes receiving, at a communication device, first received signals and receiving, at the communication device, second received signals. The method also includes calculating a plurality of estimated channel vectors from the first received signals and calculating a plurality of estimated data covariance matrices from the second received signals. A plurality of combining weight vectors are determined based on the calculated plurality of estimated channel vectors and the calculated plurality of estimated data covariance matrices. The second received signals and the plurality of combining weight vectors are combined to obtain a plurality of combined signals, wherein interference in the second received signals is suppressed in the plurality of combined signals.

According to particular embodiments, the plurality of combined signals are processed with a despreader to reverse orthogonal cover code (OCC) spreading with cyclic shift as applied to the first and second received signals. Soft values for the coded bits of the processed combined signals are calculated, and the calculated soft values are processed based on codeword combining and interleaving. The processed calculated soft values are decoded, based on encoding specifications for processing by the communication device.

Certain embodiments are directed to a communication device operable in a communication network and structured to suppress interference in received signals. The communication device includes a processor, a memory coupled to the processor, a transceiver coupled to the processor, and an antenna coupled to the transceiver configured to transmit and receive signals. The processor is configured to receive first received signals and receive second received signals. The processor also calculates a plurality of estimated channel vectors from the first received signals and calculates a plurality of estimated data covariance matrices from the second received signals. The processor is also configured to determine a plurality of combining weight vectors based on the calculated plurality of estimated channel vectors and the calculated plurality of estimated data covariance matrices and to combine the second received signals and the plurality of combining weight vectors to obtain a plurality of combined signals, wherein interference in the second received signals is suppressed in the plurality of combined signals.

In particular embodiments, the processor is further configured to process the plurality of combined signals with a despreader to reverse orthogonal cover code (OCC) spreading with cyclic shift as applied to the first and second received signals. The processor is also configured to calculate soft values for the coded bits of the processed combined signals, and to process the calculated soft values based on codeword combining and interleaving. The processor is further configured to decode the processed calculated soft values, based on encoding specifications for processing by the communication device.

According to particular embodiments, a method for suppressing interference in a communication network including a plurality of communication devices is provided. The method includes receiving, at a communication device, first received signals and second received signals. The method further provides for calculating a first plurality of estimated channel vectors from the first received signals and calculating a second plurality of estimated channel vectors from the first received signals. A further aspect of the method includes calculating a plurality of estimated data covariance matrices from the second received signals and the calculated second plurality of estimated channel vectors. The method further provides for determining a plurality of combining weight vectors based on the calculated first plurality of estimated channel vectors and the calculated plurality of estimated data covariance matrices and combining the second received signals and the plurality of combining weight vectors to obtain a plurality of combined signals, wherein interference in the second signals is suppressed in the plurality of combined signals.

Certain embodiments are directed to a communication device operable in a communication network and structured to suppress interference in received signals. The communication device includes a processor, a memory coupled to the processor, a transceiver coupled to the processor, and an antenna coupled to the transceiver configured to transmit and receive signals. The processor is configured to receive first received signals and second received signals. The processor is also configured to calculate a first plurality of estimated channel vectors from the first received signals, to calculate a second plurality of estimated channel vectors from the first received signals, and to calculate a plurality of estimated data covariance matrices from the second received signals and the calculated second plurality of estimated channel vectors. The processor is further configured to determine a plurality of combining weight vectors based on the calculated first plurality of estimated channel vectors and the calculated plurality of estimated data covariance matrices and to combine the second received signals and the plurality of combining weight vectors to obtain a plurality of combined signals, wherein interference in the second received signals is suppressed in the plurality of combined signals.

BRIEF DESCRIPTION OF THE DRAWINGS

The accompanying drawings, which are incorporated herein and form part of the specification, illustrate various embodiments of the present disclosure and, together with the description, further serve to explain the principles of the disclosure and to enable a person skilled in the pertinent art to make and use the embodiments disclosed herein. In the drawings, like reference numbers indicate identical or functionally similar elements.

DETAILED DESCRIPTION

Particular embodiments are directed to devices and methods for suppressing interference, such as inter-cell and intra-cell interference, in a communication network based on estimated channel vectors and estimated data covariance matrices.

Figure 1:
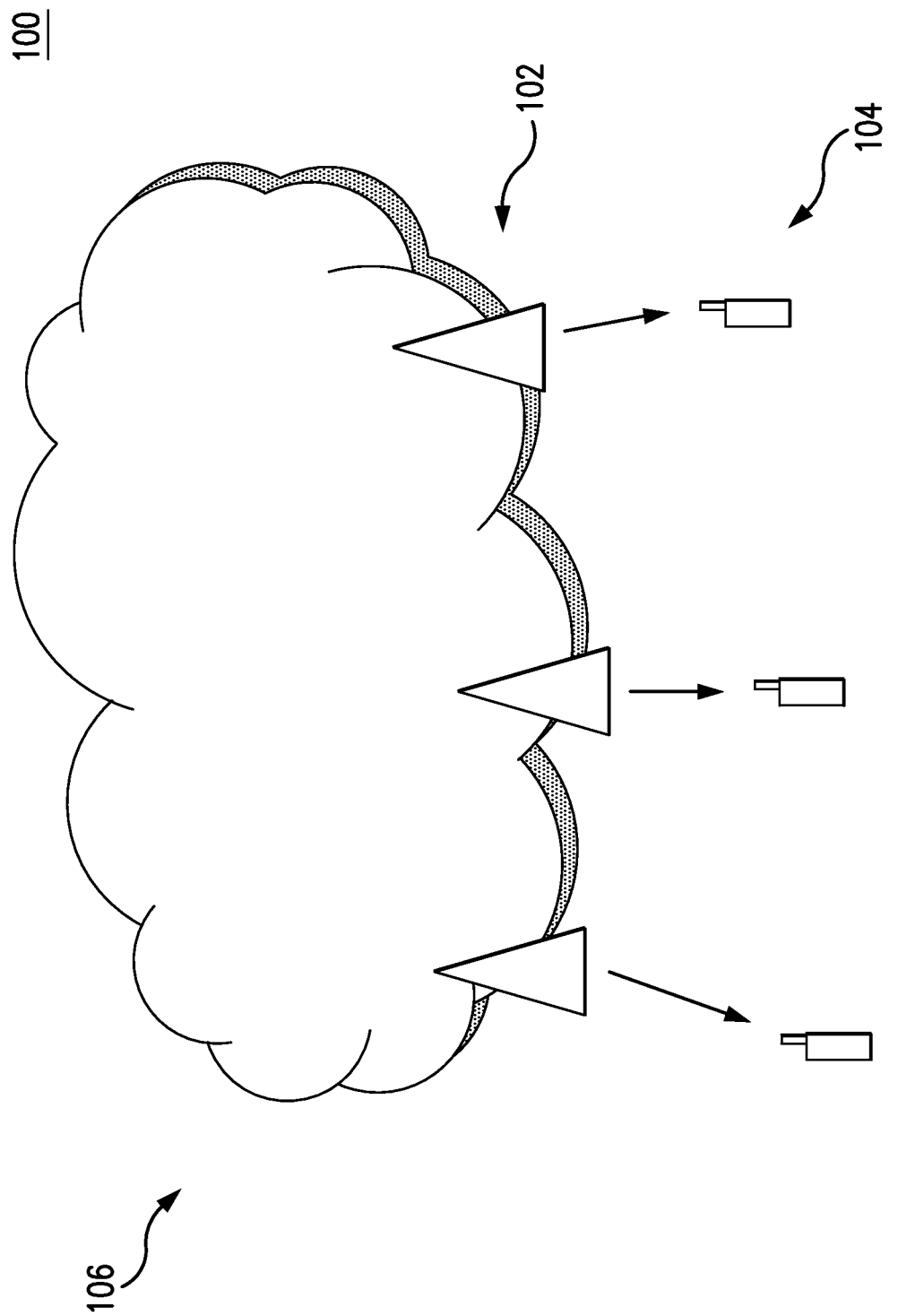
FIG. 1 is an illustration of a wireless communication system.
Figure 2:
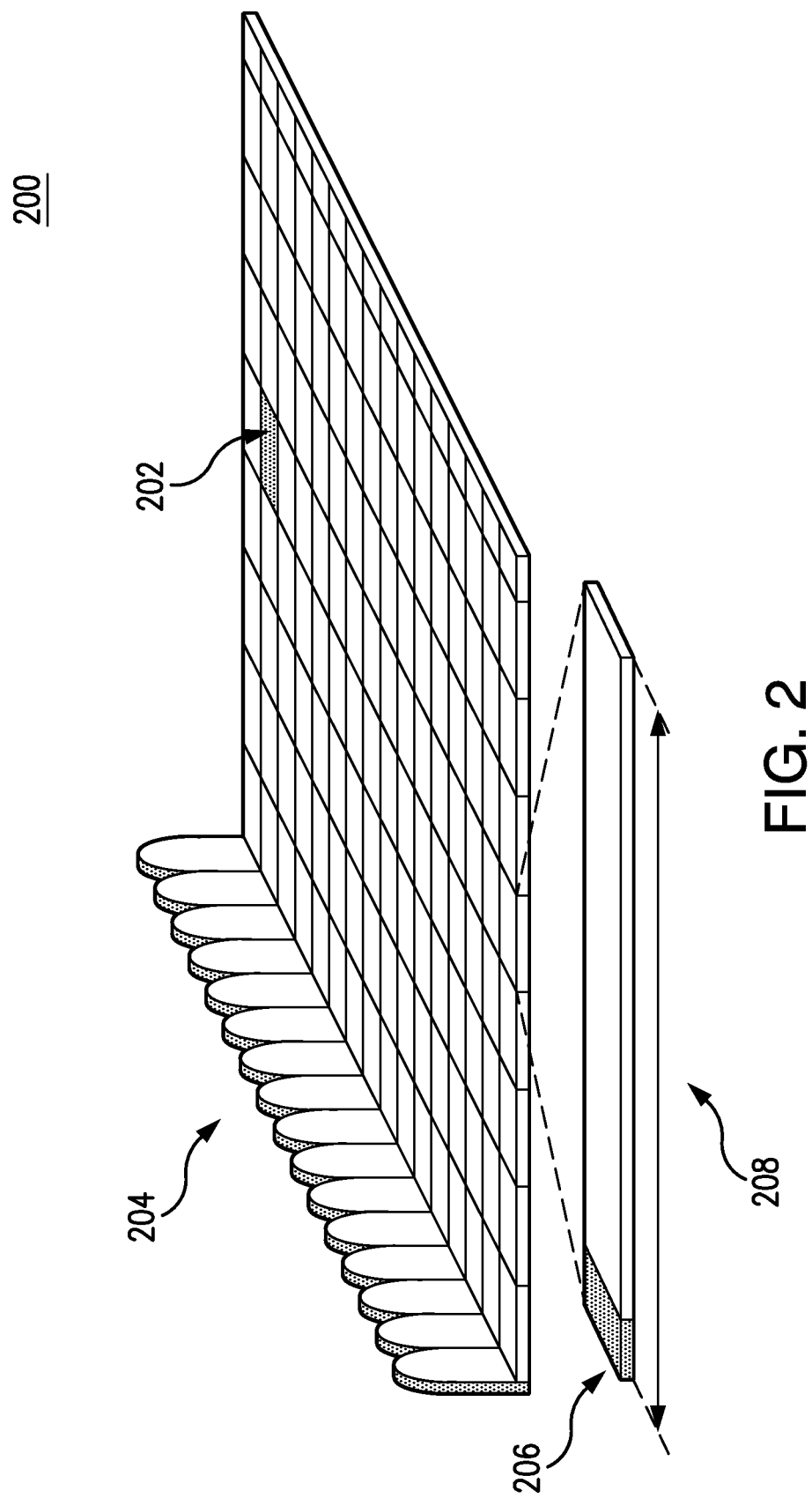
FIG. 2 is an exemplary sub-frame of an LTE transmission, shown as a time-frequency grid.
Figure 3:
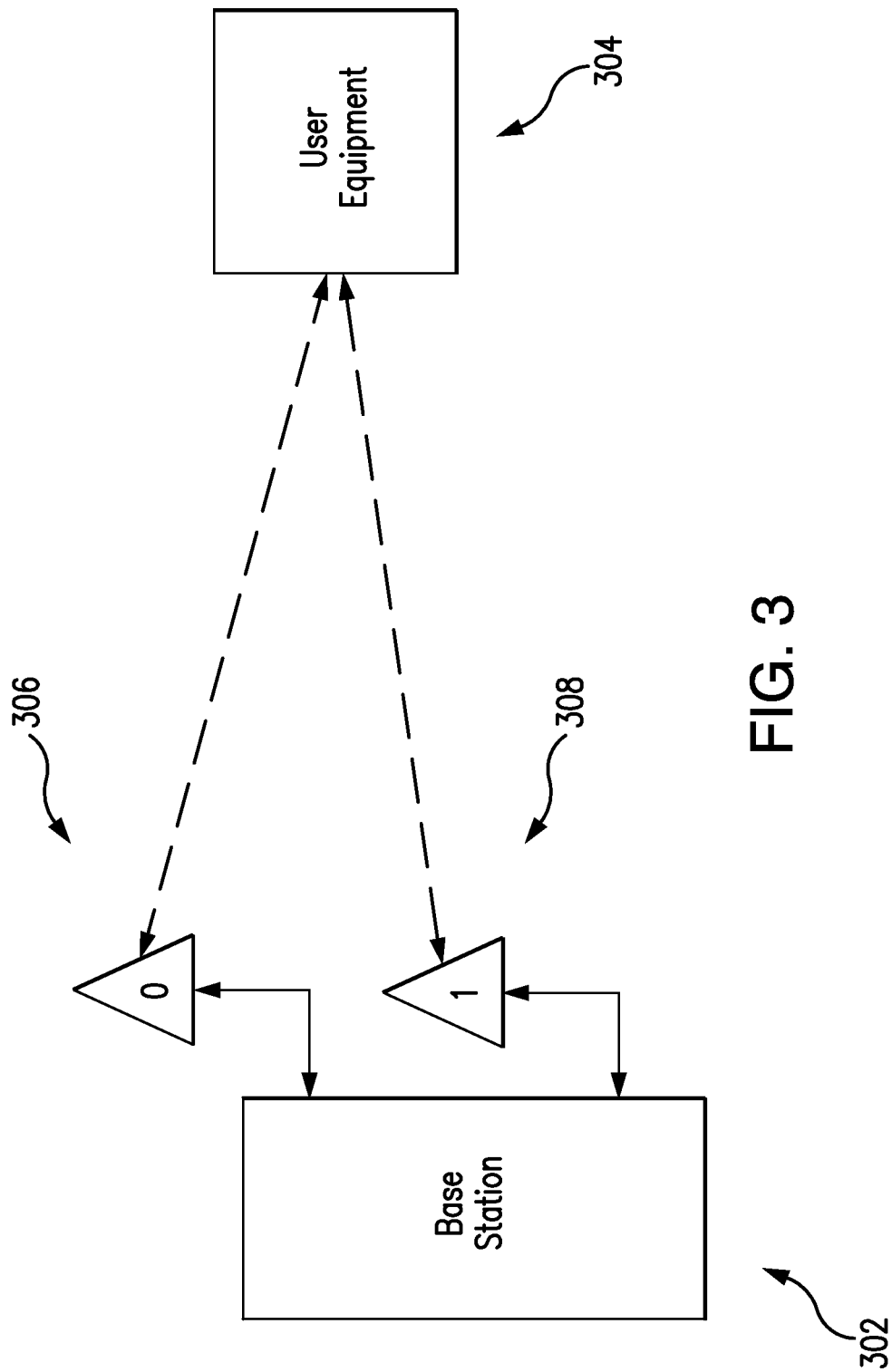
FIG. 3 is an exemplary sub-frame of an LTE transmission, shown as a time-frequency grid.
Figure 4:
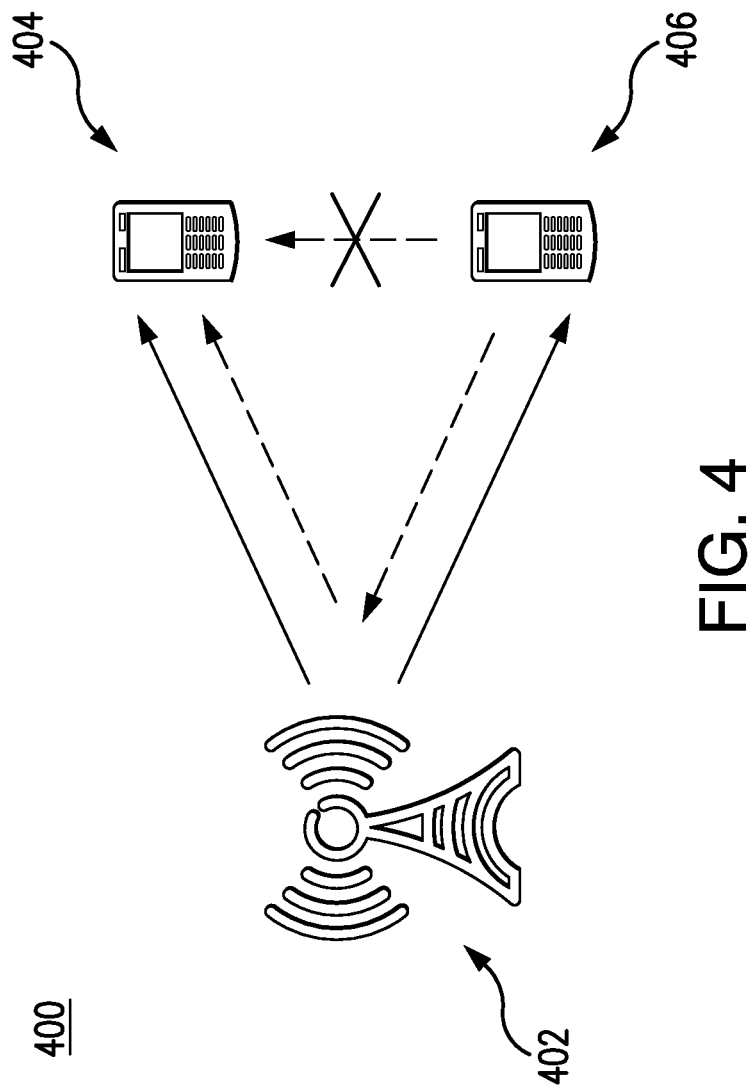
FIG. 4 is a block diagram of an exemplary MIMO system.
Figure 5:
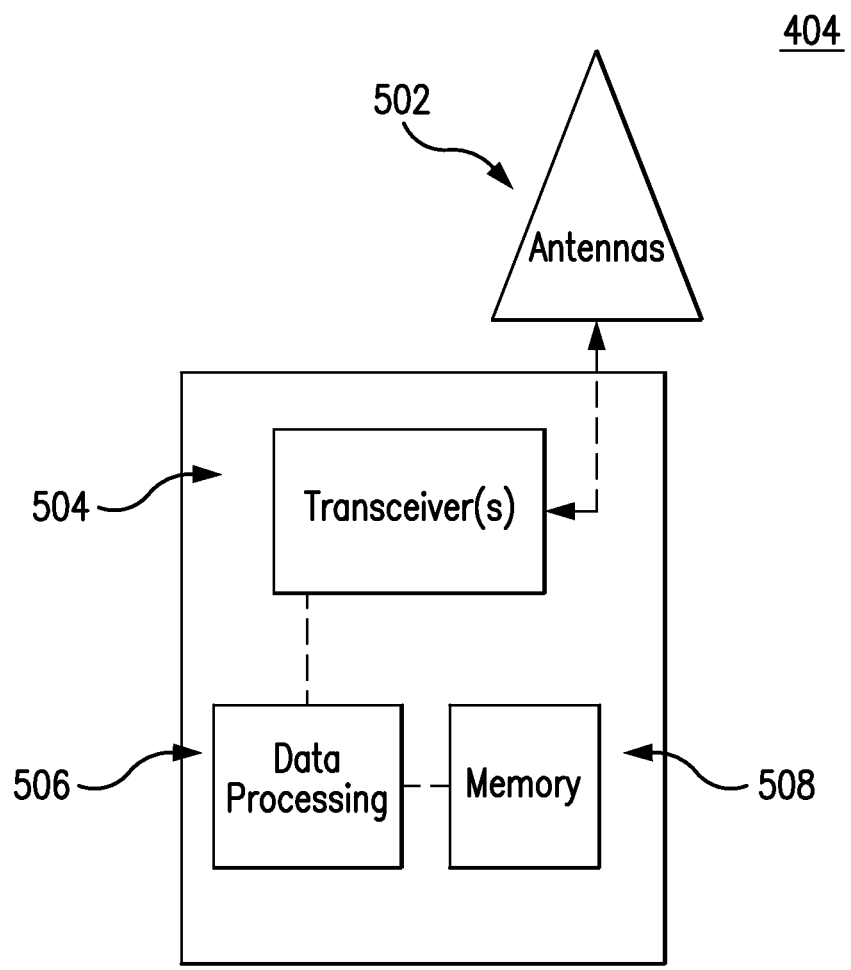
FIG. 5 is a block diagram of a user device in accordance with exemplary embodiments of the present invention.
Figure 6:
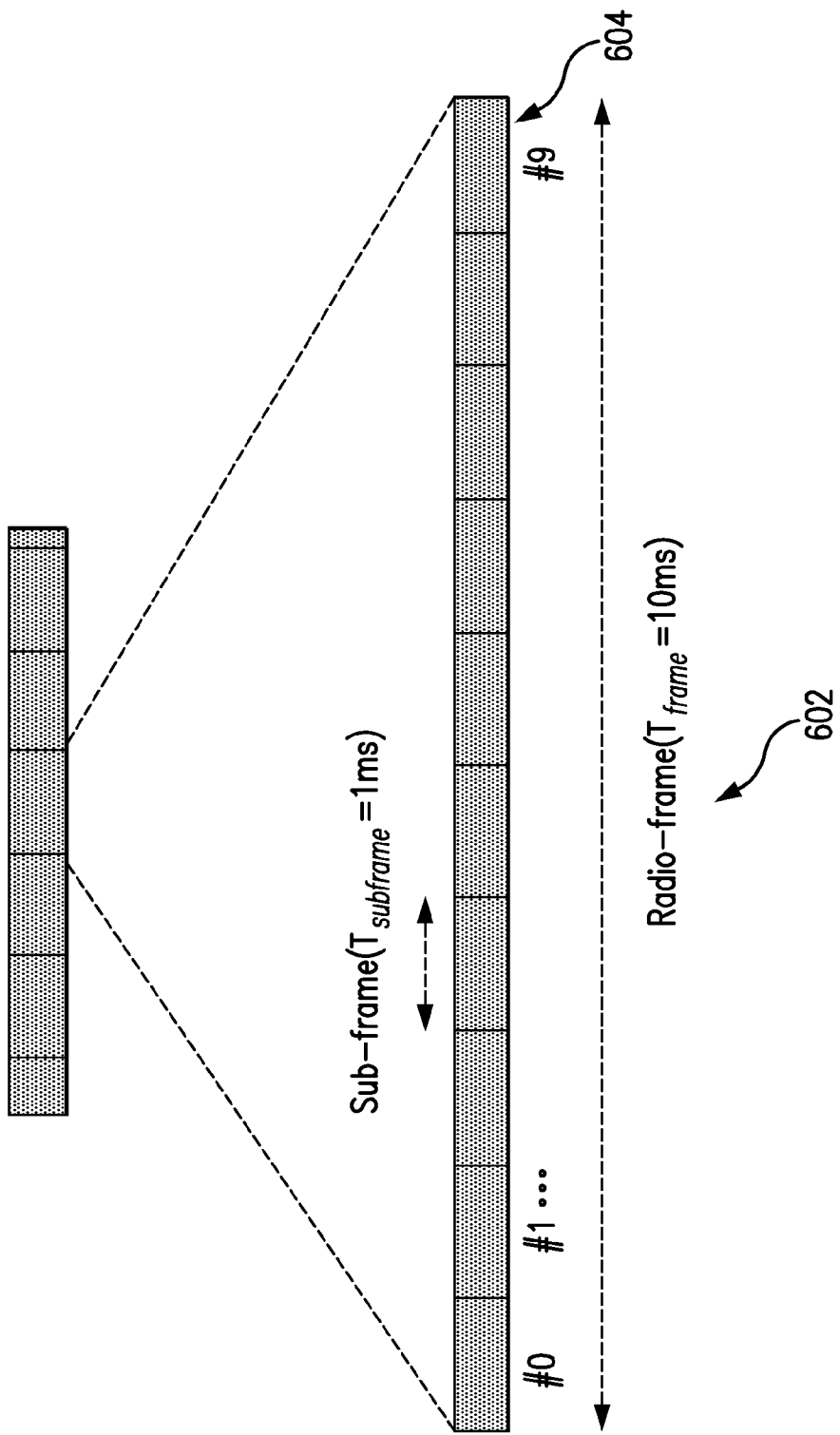
FIG. 6 is an illustration of a LTE time-domain structure.
Figure 7:
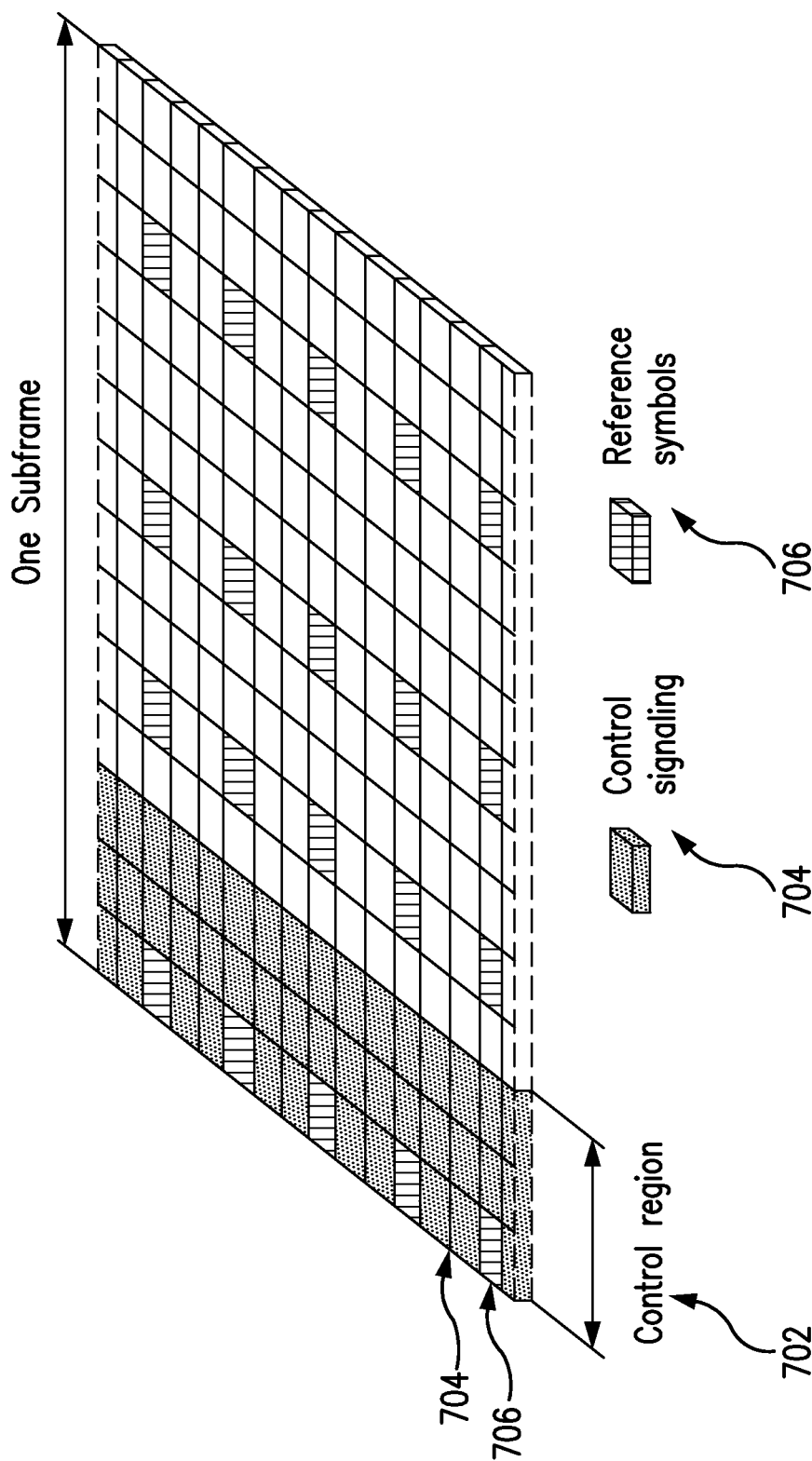
FIG. 7 is an illustration of an OFDM downlink subframe structure.
Figure 8:
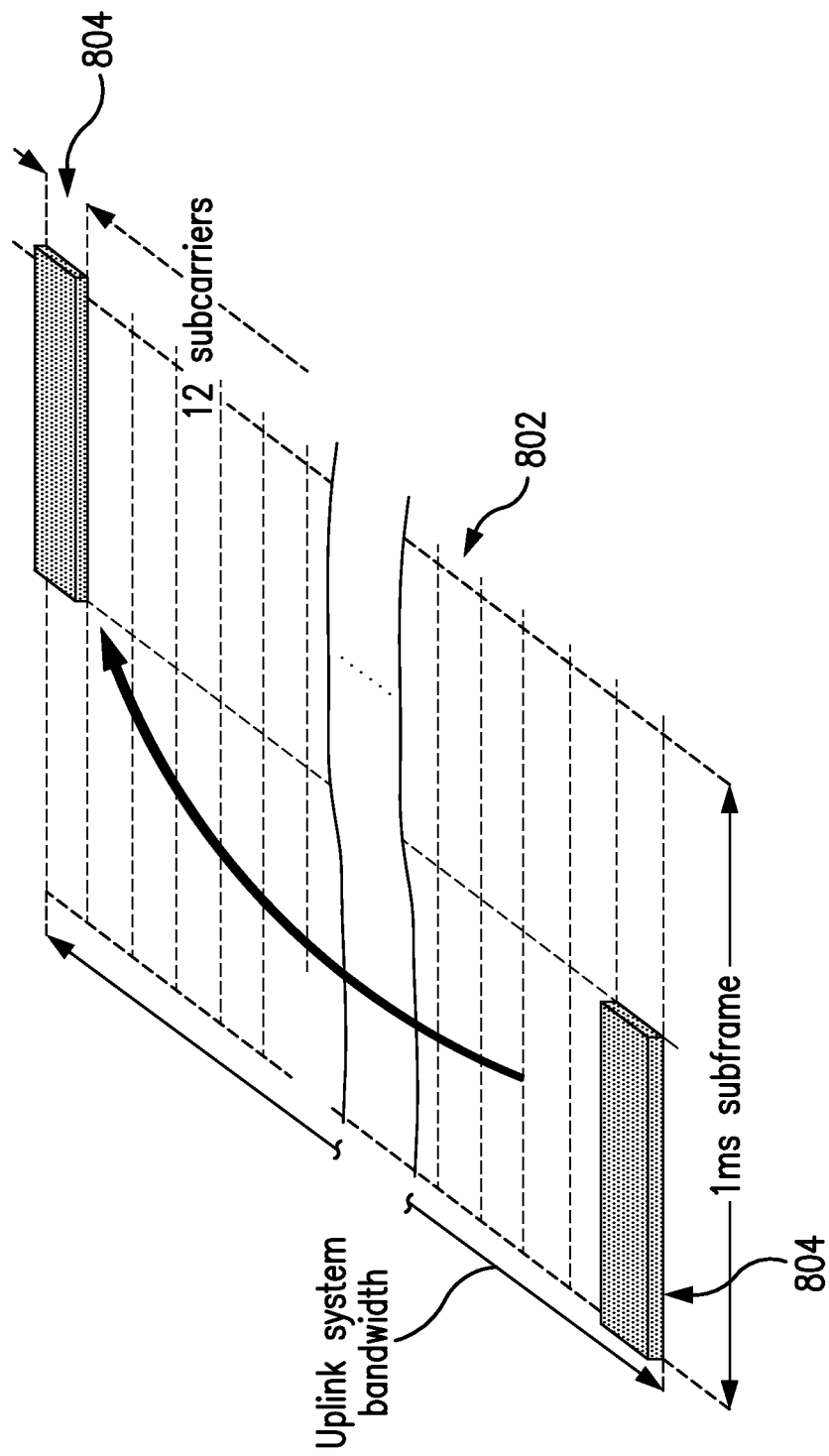
FIG. 8 is an illustration of uplink L1/L2 control signaling transmission on Rel-8 PUCCH.

FIG. 5 illustrates a block diagram of an exemplary user equipment (UE) device 404. As shown in FIG. 5, the UE device may include one or more transmit antennas 502 and one or more transceivers 504. The UE device 404 may also include a data processing system and resources 506, which may include one or more microprocessors and/or one or more circuits, such as an application specific integrated circuit (ASIC), field-programmable gate arrays (FPGAs), or the like. The UE device 404 may also comprise data storage or a memory system 508, which may include one or more non-volatile storage devices and/or one or more volatile storage devices (e.g., random access memory (RAM)). The one or more antennas 502 are connected to transceiver 504, which is configured to transmit and receive signals via the antennas 502.

In embodiments where data processing system 506 includes a microprocessor, computer readable program code may be stored in a computer readable medium, such as, but not limited to, magnetic media (e.g., a hard disk), optical media (e.g., a DVD), memory devices (e.g., random access memory), and the like. In some embodiments, computer readable program code is configured such that when executed by a processor, the code causes the data processing system 506 to perform steps described below (e.g., steps described below with reference to the flow charts shown in the figures). In other embodiments, the UE device 404 is configured to perform steps described above without the need for code. That is, for example, data processing system 506 may include one or more ASICs. Hence, the features of the particular embodiments described above may be implemented in hardware and/or software. For example, in particular embodiments, the functional components of the UE device 404 described above may be implemented by data processing system 506 executing computer instructions, by data processing system 406 operating independent of any computer instructions, or by any suitable combination of hardware and/or software.

According to certain embodiments, the methods and devices may be implemented in a communication network 106 that includes a base station 102, 302 with multiple transmit antennas 306, 308, while a number of UE devices 104, 404 in communication with the base station 102, 302 have only a single receive antenna. One of ordinary skill in the art will recognize that this scenario may be extended to the case of K transmit antennas and K UE devices 104, 404, for K>2. Similarly, the methods disclosed herein may also apply to UE devices 104, 404 that have more than one receive antenna.

Figure 9:
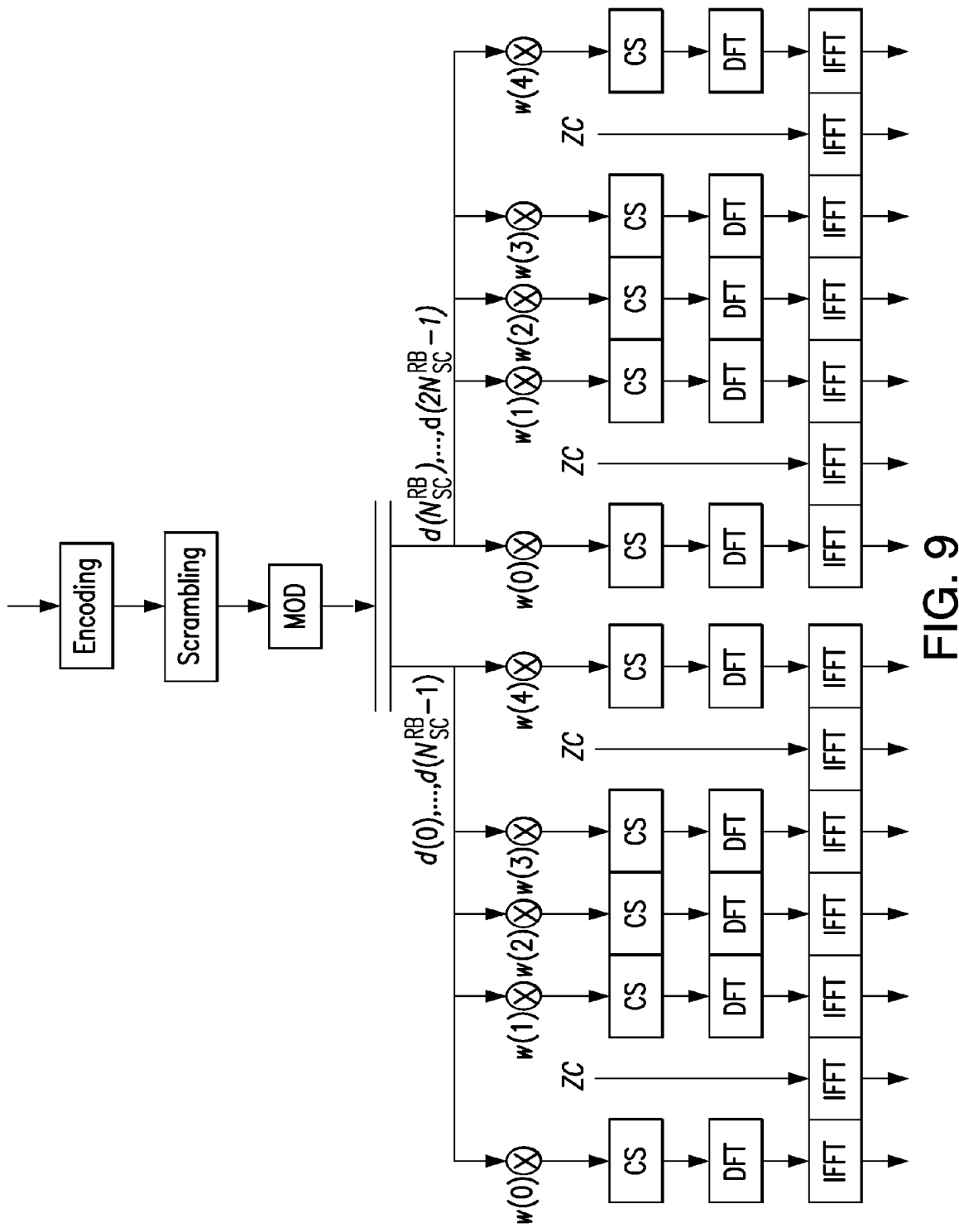
FIG. 9 is an illustration of a DFTS-OFDM based PUCCH Format 3 for a user device supporting more than four HARQ bits in normal CP subframes.
Figure 10A:
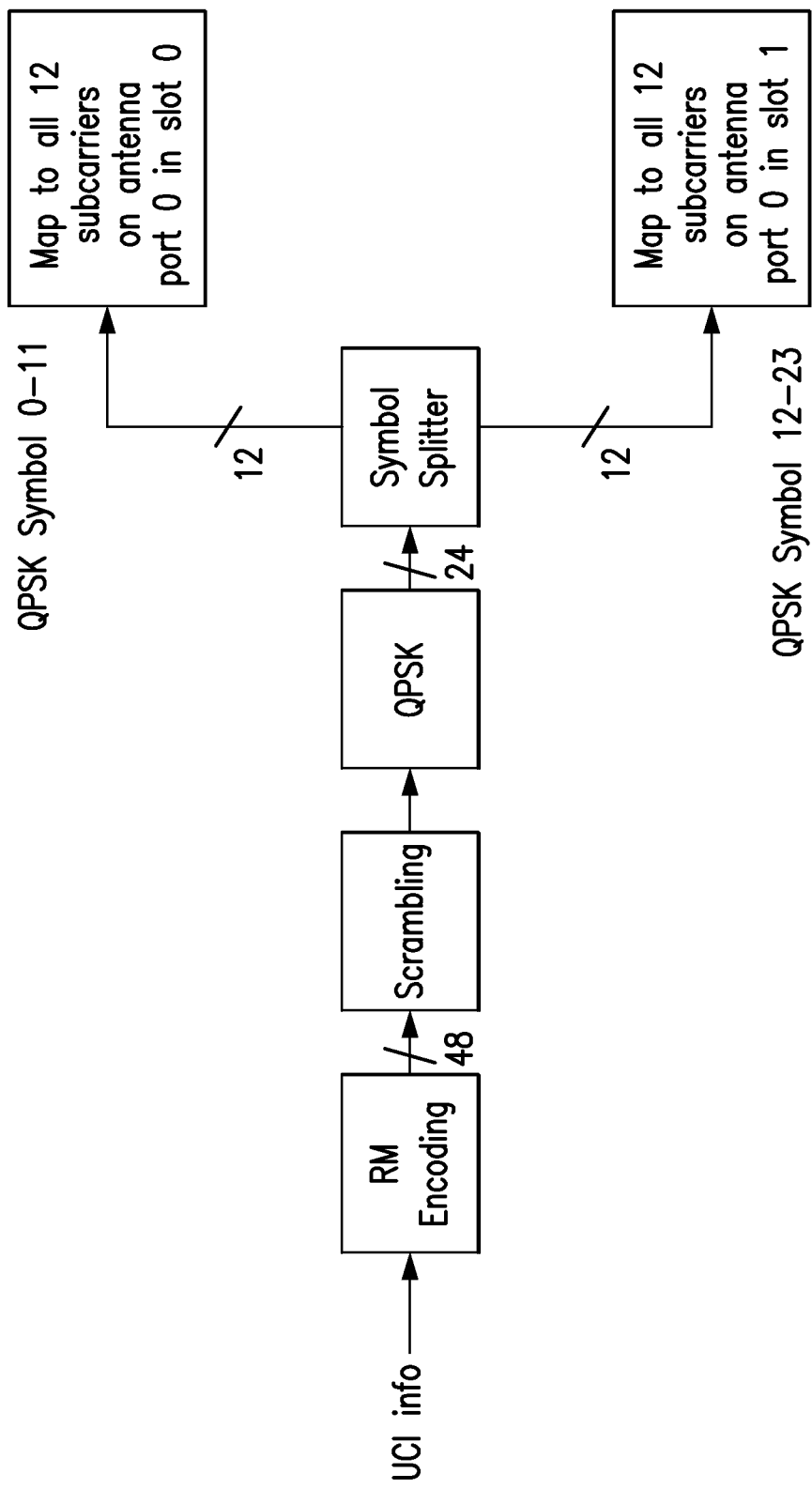
FIG. 10(a) is a flow chart illustrating a process for encoding and multiplexing up to eleven Uplink Control Information (UCI) bits.
Figure 10B:
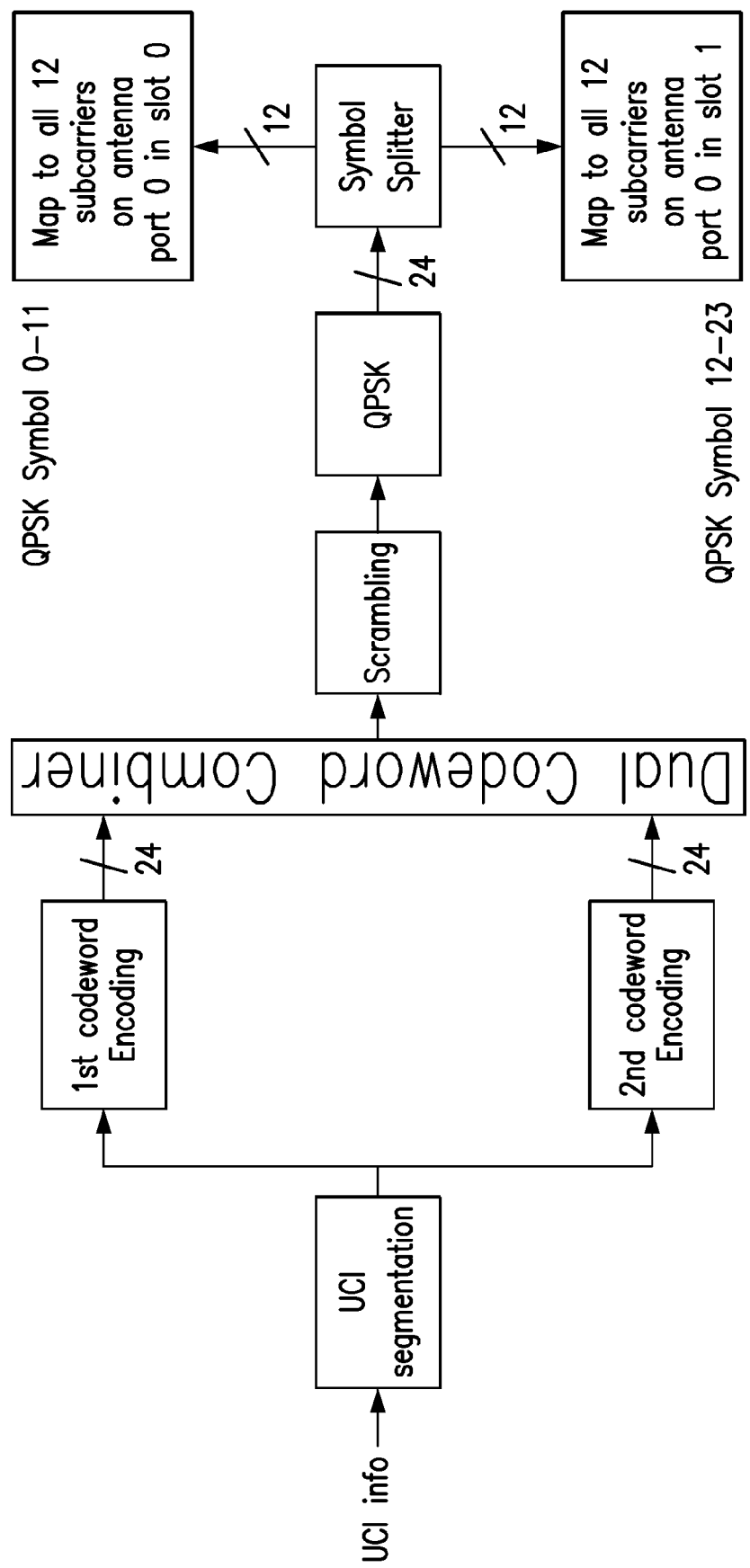
FIG. 10(b) is a flow chart illustrating a process for encoding and multiplexing twelve to twenty-one Uplink Control Information bits.
Figure 13:
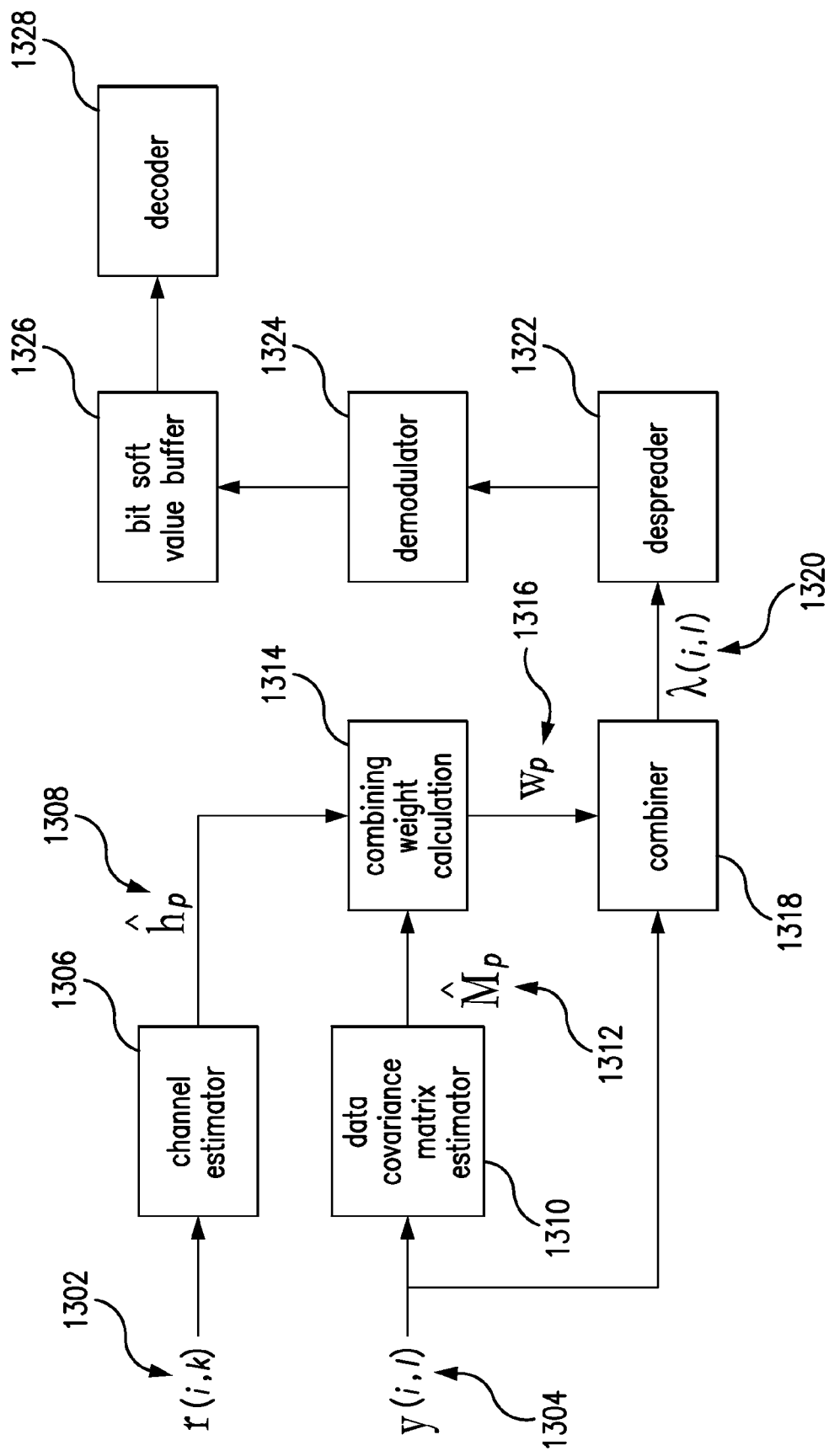
FIG. 13 is a flow chart illustrating a process for suppressing inter-cell interference in accordance with exemplary embodiments of the present invention.
Figure 14:
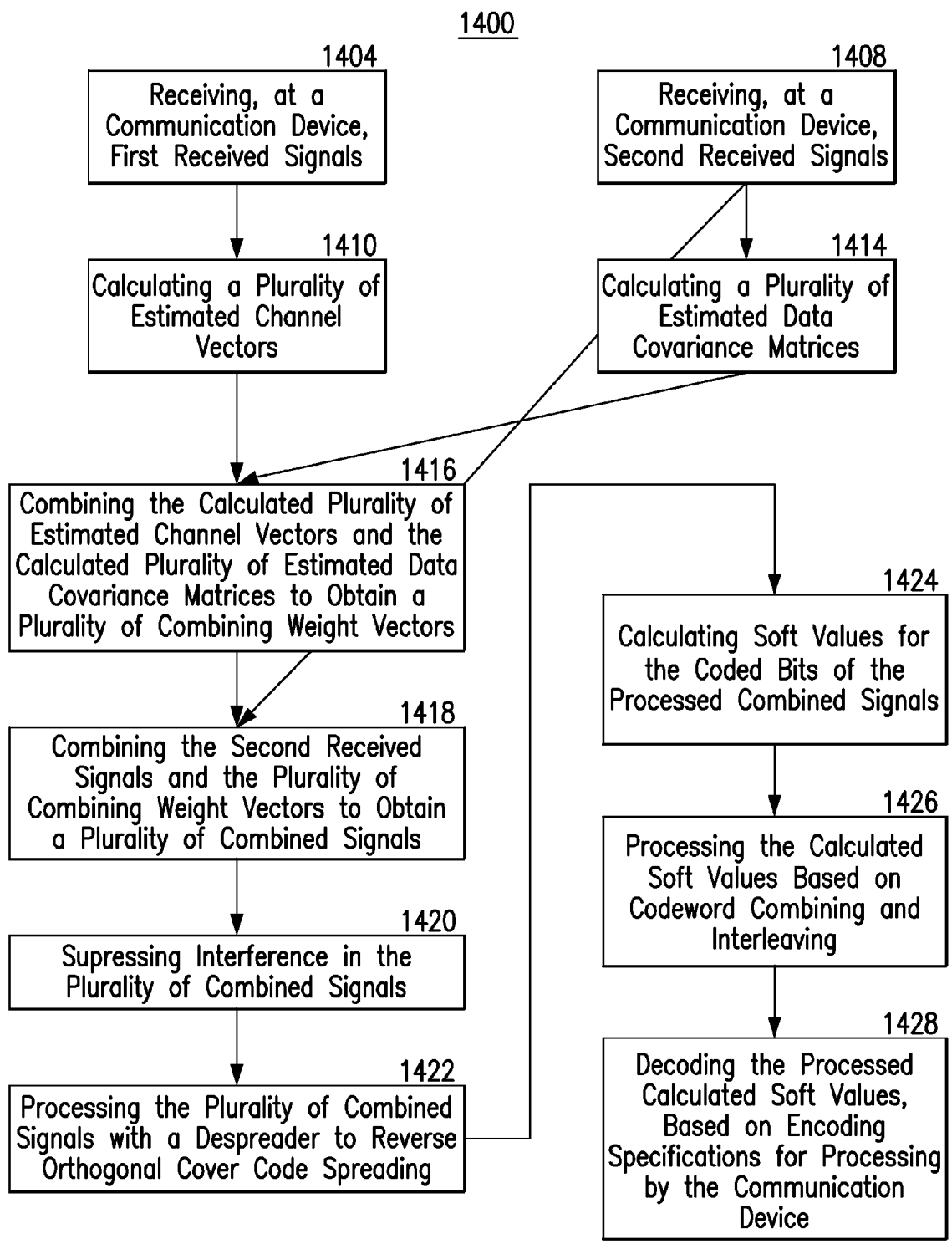
FIG. 14 is a flow chart illustrating a process for suppressing inter-cell interference in accordance with exemplary embodiments of the present invention.

A process according to a particular embodiment for suppressing inter-cell interference is illustrated in FIGS. 13 and 14, with reference to the signal elements shown in FIG. 9. Channel estimates are calculated from the received signals for the reference signals r(i,k), with the reference signals represented in FIG. 9 as the ZC elements. Data covariance matrix estimates are calculated from the received signals for the data signals y(i,l), with the data signals represented in FIG. 9 as signals with DFT precoding. The combined output is processed by a despreader to reverse the OCC spreading and cyclic shift operations performed according to the PUCCH Format 3 specification. The output from the despreader is sent to a demodulator to calculate the soft values for the coded bits. Soft values from the soft value buffer are read according to codeword combining and interleaving specifications of the transmitted signals. The read-out soft values are decoded by a decoder matching to the encoding specifications of the transmitted signals.

Referring now to FIGS. 13 and 14, there is shown a flow chart illustrating a method of a particular embodiment for suppressing interference in a communication network 106 including a plurality of user communication devices 404. In steps 1404 and 1408, first and second received signals 1302, 1304 are respectively received at a user communication device 404. A plurality of estimated channel vectors 1308 are calculated by a channel estimator 1306 from the first received signals 1302 in step 1410. In step 1414, a plurality of estimated data covariance matrices 1312 are calculated by a data covariance matrix estimator 1310 from the second received signals 1304. A plurality of combining weight vectors 1316 are determined in step 1416 based on the calculated plurality of estimated channel vectors 1308 and the calculated plurality of estimated data covariance matrices 1312 by a first combiner 1314. In step 1418, the second received signals 1304 and the plurality of combining weight vectors 1316 are combined by a first combiner 1318 to obtain a plurality of combined signals 1320, wherein interference in the second received signals is suppressed in step 2320 in the plurality of combined signals 1320. The plurality of combined signals 1320 are processed in step 1422 with a despreader 1322 to reverse orthogonal cover code (OCC) spreading with cyclic shift as applied to the first 1302 and second 1304 received signals. In step 1424, soft values for the coded bits of the processed combined signals, after being processed by a demodulator 1324, are calculated. The calculated soft values are processed in a bit soft value buffer 1326 in step 1426 based on codeword combining and interleaving. The processed calculated soft values are decoded by a decoder 1328 in step 1428, based on encoding specifications for processing by the plurality of communication devices 404.

Figure 15:
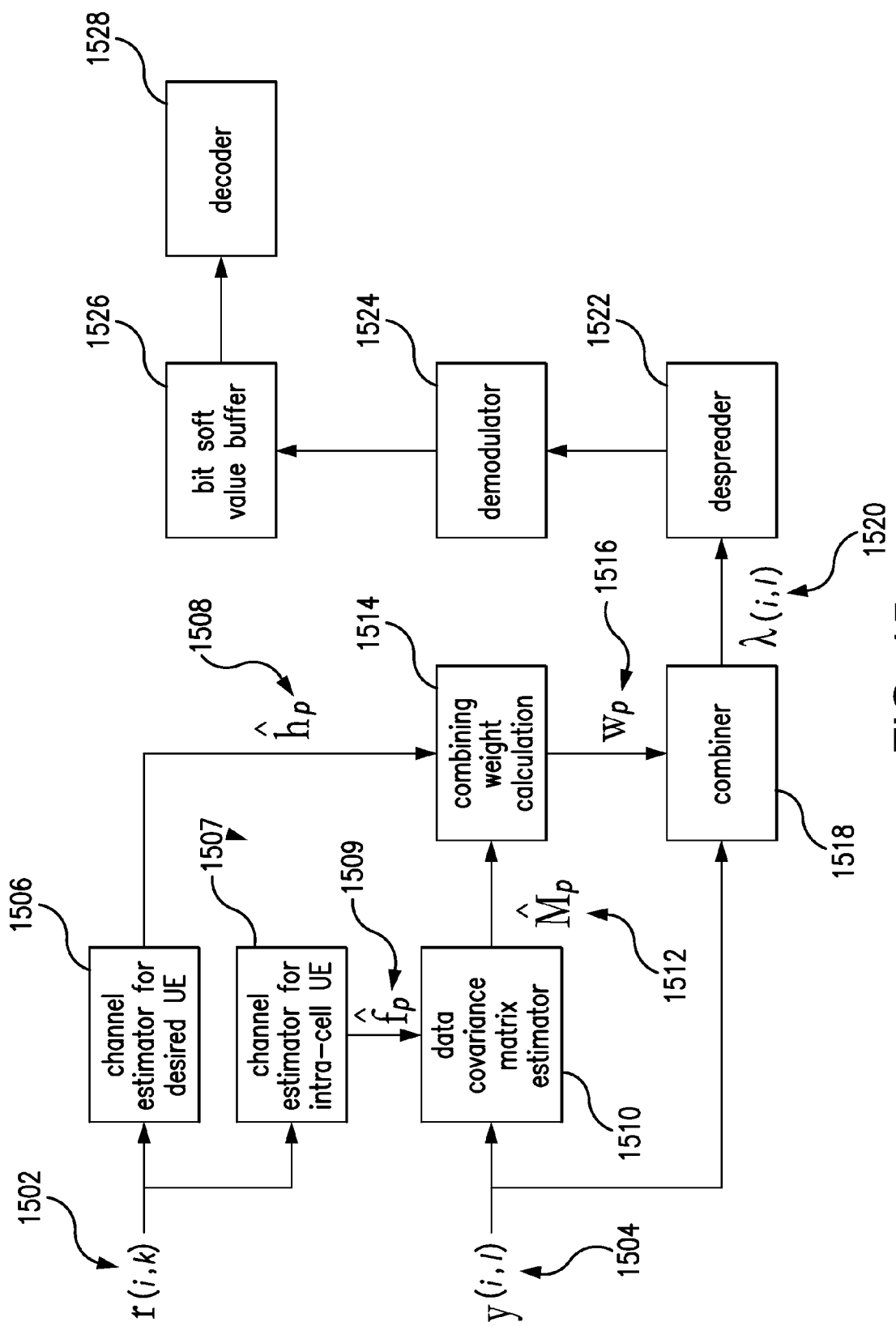
FIG. 15 is a flow chart illustrating a process for suppressing intra-cell interference in accordance with exemplary embodiments of the present invention.
Figure 16:
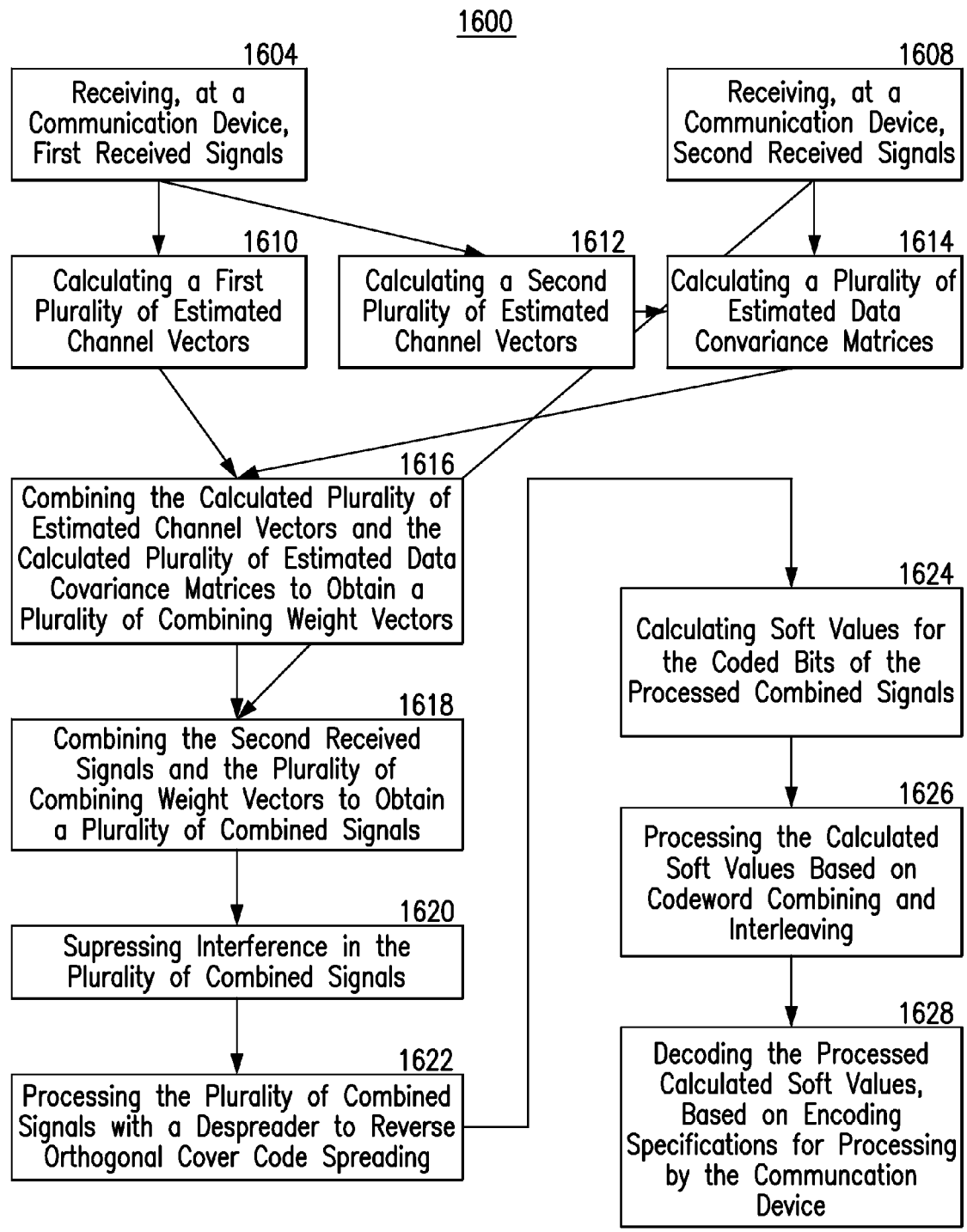
FIG. 16 is a flow chart illustrating a process for suppressing intra-cell interference in accordance with exemplary embodiments of the present invention.

The flow of a process according to a particular embodiment for suppressing intra-cell and inter-cell interference is illustrated in FIGS. 15 and 16. In this embodiment, explicit processing of intra-cell interference is incorporated to improve the data covariance matrix estimation quality. More specifically, channel estimates of other intra-cell interference are use to construct a parametric estimate of the intra-cell interference covariance matrix. An improved data covariance matrix estimate can be obtained by subtracting the contributions of the intra-cell interfering UEs.

Referring now to FIGS. 15 and 16, there is shown a flow chart illustrating a method of a particular embodiment for suppressing intra-cell interference in a communication network 106 including a plurality of user communication devices 404. In steps 1604 and 1608, first and second received signals 1502 and 1504 are respectively received at a user communication device 404. A first plurality of estimated channel vectors 1508 are calculated by a first channel estimator 1506 in step 1610 from the first received signals 1502, and a second plurality of estimated channel vectors 1509 are calculated by a second channel estimator 1507 in step 1612 from the first received signals 1502. In step 1614, a plurality of estimated data covariance matrices 1512 are calculated by a data covariance matrix estimator 1510 from the second received signals 1504 and the calculated second plurality of estimated channel vectors 1509. A plurality of combining weight vectors 1516 are determined in step 1616 based on the calculated first plurality of estimated channel vectors 1508 and the calculated plurality of estimated data covariance matrices 1512 by a first combiner 1514. In step 1618, the second received signals 1504 and the plurality of combining weight vectors 1516 are combined by a second combiner 1518 to obtain a plurality of combined signals 1520, wherein interference in the second 1504 signals is suppressed in step 1620 in the plurality of combined signals 1520. The plurality of combined signals 1520 is processed in step 1622 with a despreader 1522 to reverse orthogonal cover code (OCC) spreading with cyclic shift as applied to the first 1502 and second 1504 received signals. In step 1624, soft values for the coded bits of the processed combined received signals, after being processed by a demodulator 1524, are calculated. The calculated soft values are processed in a bit soft value buffer 1526 in step 1626 based on codeword combining and interleaving. The processed calculated soft values are decoded by a decoder 1528 in step 1628, based on encoding specifications for processing by the plurality of communication devices 404.

Signals transmitted by a UE device 404 in the uplink may be interfered by inter-cell and/or intra-cell UE's, as illustrated in FIG. 13. Therefore, in addition to the PUCCH signal transmitted by the desired UE devices within the cell, there may be additional PUCCH signals transmitted by interfering UE devices from other cells on the same radio resource. An example of a UE device operating in a communication network with frequency switched transmit diversity coding, such as the specific structure of the PUCCH Format 3 with frequency-switched transmit diversity, according to particular embodiments is described below.

Let $n_R$ denote the number of receive antennas available at the UE device receiver and P denote the number of transmit antennas. Herein, the case of P=2 transmit antennas is used to illustrate particular embodiments. A person skilled in the art can apply the teaching to cases with more than two transmit antennas.

While the PUCCH signals are transmitted in two slots, in the following example, the equations and receiver processing procedures are described for one slot. The same computation procedures can be applied to each slot.

Figure 11A:
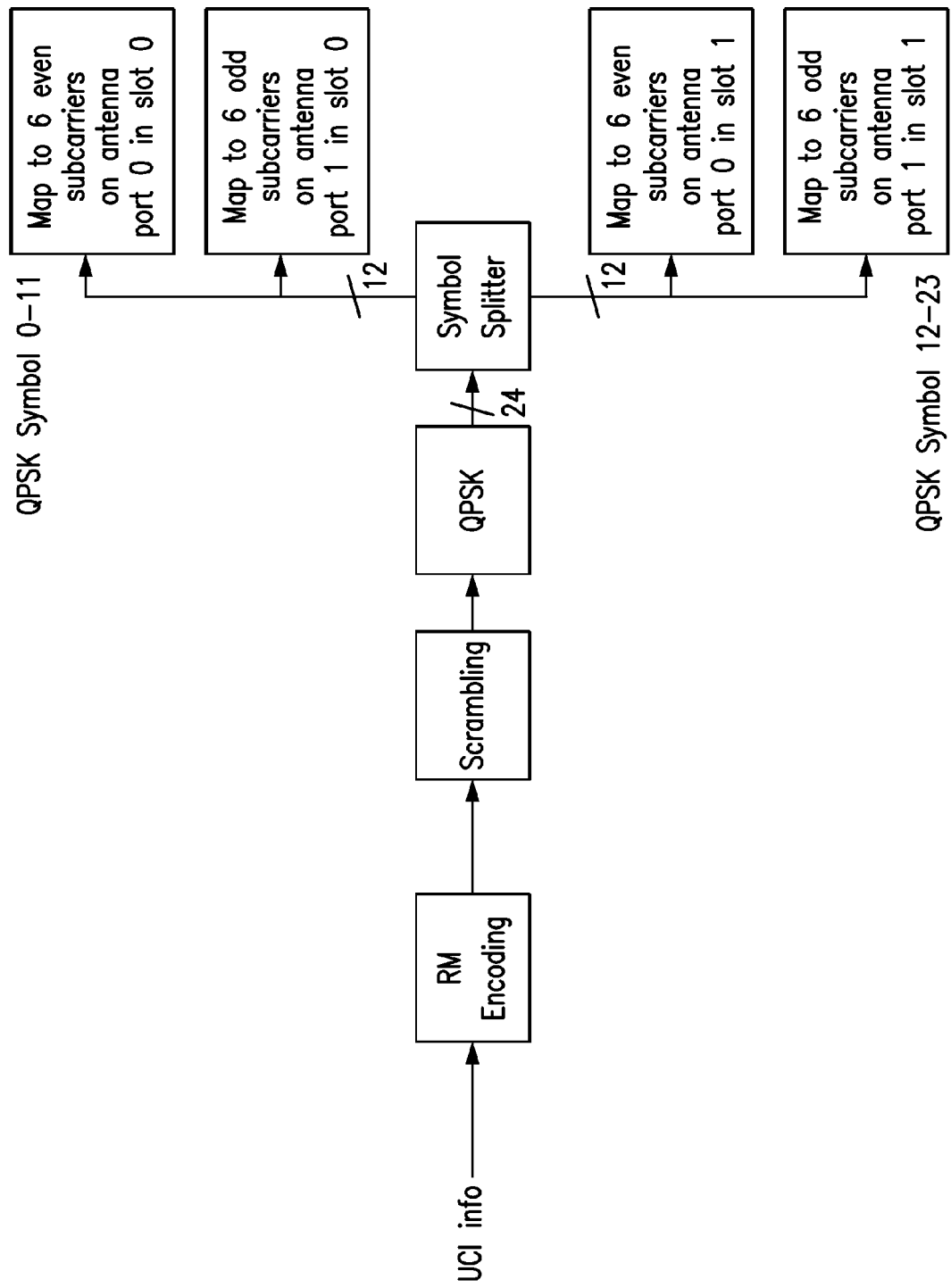
FIG. 11(a) is a flow chart illustrating the details of encoding and multiplexing of the frequency switched transmit diversity scheme for up to eleven UCI bits.
Figure 11B:
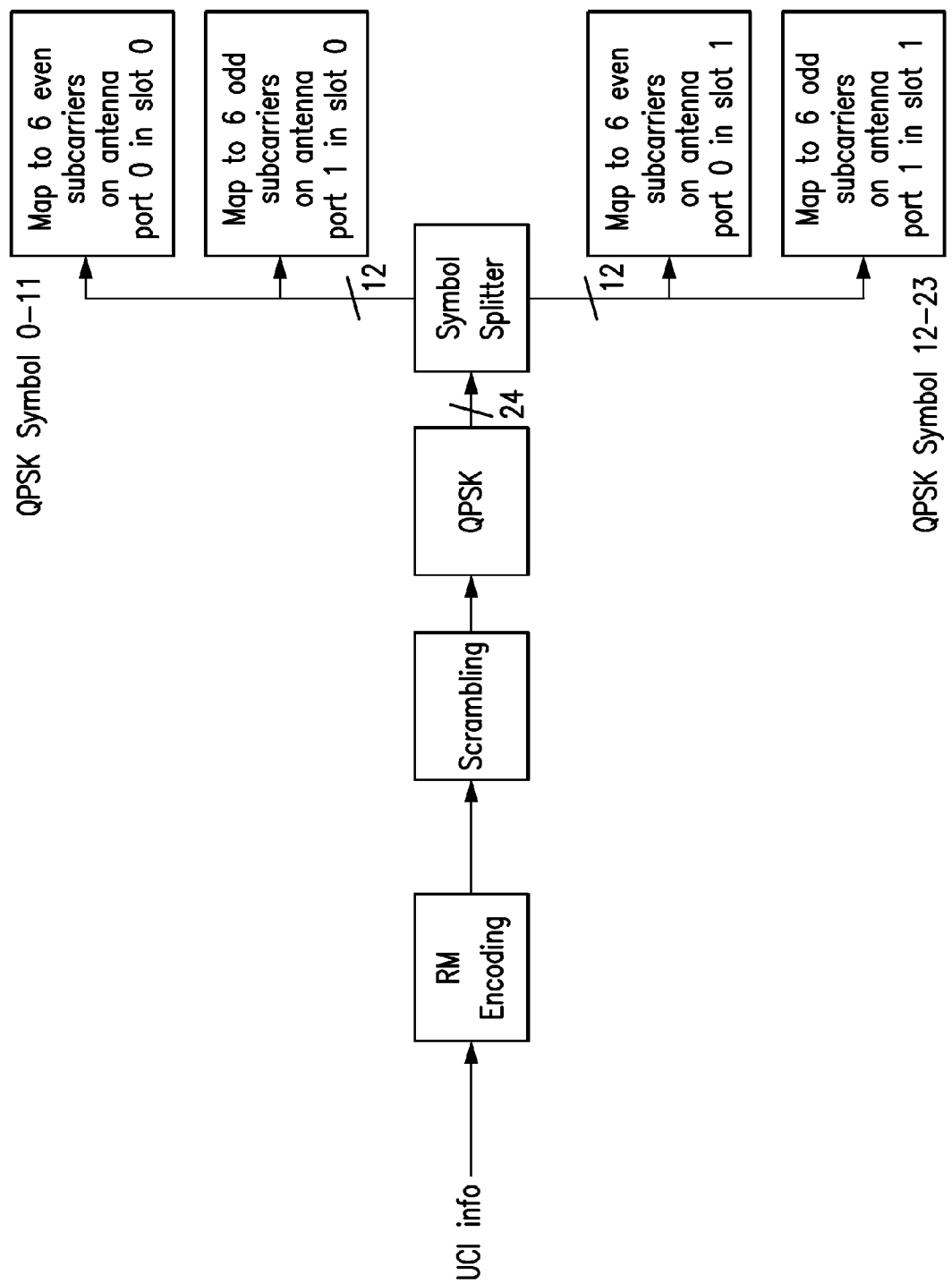
FIG. 11(b) is a flow chart illustrating the details of encoding and multiplexing of the frequency switched transmit diversity scheme for twelve to twenty-two UCI bits.
Figure 12:
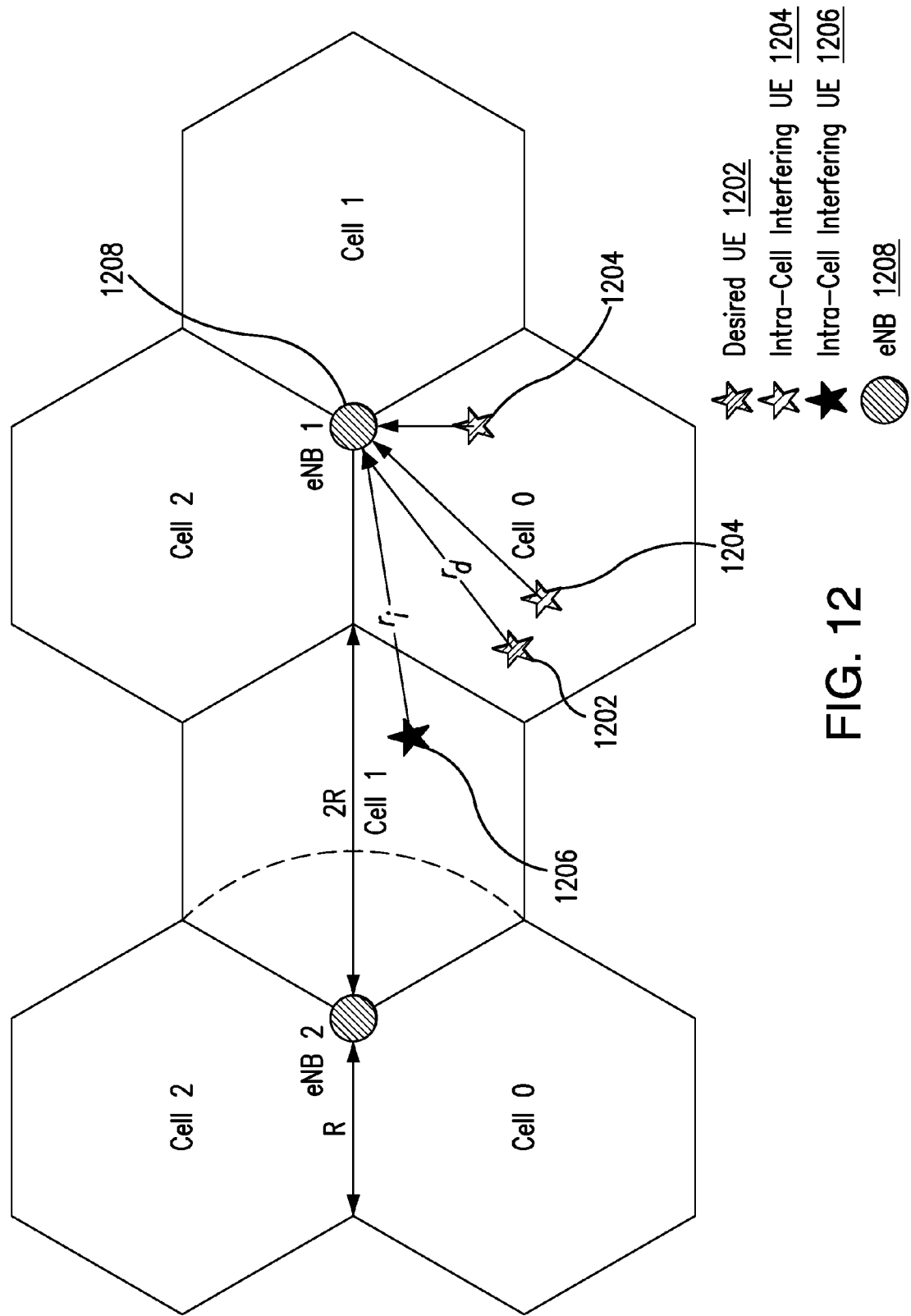
FIG. 12 illustrates inter-cell and intra-cell interference experienced by a user device transmitting PUCCH Format 3 in the uplink.

To illustrate particular embodiments, a first example assumes only inter-cell interference to the desired UE device's PUCCH signal. Let $s_p(i,k)$ be the reference symbol transmitted on the ith subcarrier during the kth SC-FDMA symbol for RS from transmit antenna p of the desired UE device. Let $t_p(i,k)$ be the reference symbol transmitted on the ith subcarrier during the kth SC-FDMA symbol for RS from transmit antenna p of the inter-cell interfering UE device. As illustrated in FIG. 11, i ranges from 0 to 11, and k ranges from 0 to 1 in one slot. The antenna index p ranges from 0 to P−1.

Let $h_p$ be a $n_R \times 1$ vector containing the $n_R$ channel coefficients from the pth transmit antenna of the desired UE device to the $n_R$ receive antennas. Let $g_p$ be a $n_R \times 1$ vector containing the $n_R$ channel coefficients from the pth transmit antenna of the inter-cell interfering UE device to the $n_R$ receive antennas. Let r(i,k) be a $n_R \times 1$ vector containing the $n_R$ received symbols on the ith subcarrier during the kth SC-FDMA symbol for RS from the $n_R$ receive antennas. The received reference signal can be expressed as:

$$r(i,k)=s_0(i,k)h_0+s_1(i,k)h_1+t_0(i,k)g_0+t_1(i,k)g_1+v(i,k), \quad \text{EQ 4:}$$

where v(i,k) is a $n_R \times 1$ vector containing noises received on the ith subcarrier during the kth SC-FDMA symbol from the $n_R$ receive antennas. The $n_R \times n_R$ covariance matrix of v(i,k) is denoted by $\Lambda$.

Let $x_p(i,l)$ be the data symbol transmitted on the ith subcarrier during the lth SC-FDMA symbol for data from transmit antenna p of the desired UE device. Let $d_p(i,l)$ be the data symbol transmitted on the ith subcarrier during the lth SC-FDMA symbol for data from transmit antenna p of the inter-cell interfering UE device. As illustrated in FIG. 9, i ranges from 0 to 11, and l ranges from 0 to 4 in one slot. The antenna index p ranges from 0 to P−1.

Let $y(i,l)$ be a $n_R \times 1$ vector containing the $n_R$ received symbols on the ith subcarrier during the lth SC-FDMA symbol for data from the $n_R$ receive antennas. If the interfering UE device also applies frequency-switched transmit diversity transmission with the specific structure for PUCCH format 3, the received data signal can be expressed as:

$$y(i,l) = \begin{cases} x_0(i,l)h_0 + d_0(i,l)g_0 + v(i,l), & \text{if } i \text{ is even} \\ x_1(i,l)h_1 + d_1(i,l)g_1 + v(i,l), & \text{if } i \text{ is odd} \end{cases} \quad \text{EQ 5}$$

where $v(i,l)$ is a $n_R \times 1$ vector containing noises received on the ith subcarrier during the lth SC-FDMA symbol from the $n_R$ receive antennas. The $n_R \times n_R$ covariance matrix of $v(i,l)$ is denoted by $\Lambda$.

In this first example, the combining weight vectors for the UE device receiver are determined based on a plurality of data covariance matrices estimated from the subcarriers carrying the data signals and a plurality of channel coefficient vectors estimated from the subcarriers carrying the reference signals.

Since the reference symbols transmitted from the desired UE device are known at the eNB base station, the channel coefficients from the pth transmit antenna of desired UE device to the $n_R$ receive antennas can be estimated as:

$$\hat{h}_p = \frac{1}{24} \sum_{k=0}^{1} \sum_{i=0}^{11} s_p^*(i,k) r(i,k), \quad \text{EQ 10}$$

where $s_p^*(i,k)$ denotes the conjugate of $s_p(i,k)$ and $p=0$ and $1$.

The $n_R \times n_R$ data covariance matrix $\hat{M}_p$ for the pth transmit antenna is estimated as:

$$\begin{cases} \hat{M}_0 = \frac{1}{30} \sum_{l=0}^{4} \sum_{i=0}^{5} y(2i,l) y^H(2i,l) \\ \hat{M}_1 = \frac{1}{30} \sum_{l=0}^{4} \sum_{i=0}^{5} y(2i+1,l) y^H(2i+1,l) \end{cases} \quad \text{EQ 11}$$

where $y^H(i,l)$ denotes the conjugate transpose of $y(i,l)$.

The combining weight vectors are calculated as:

$$w_p = \hat{M}_p^{-1} \hat{h}_p \quad \text{EQ 12:}$$

for $p=0$ and $1$. The weight vectors are then applied to the received data signals to obtain the combined signals:

$$\lambda(i,l) = \begin{cases} w_0^H y(i,l), & \text{if } i \text{ is even} \\ w_1^H y(i,l), & \text{if } i \text{ is odd} \end{cases} \quad \text{EQ 13}$$

In the case that the inter-cell interfering UE device uses the same frequency-switch transmit diversity coding as the desired UE device, the main components of data covariance matrix estimates obtained using only the received data signals can be expressed as:

$$\begin{cases} \hat{M}_0 \approx h_0 h_0^H + g_0 g_0^H + \Lambda \\ \hat{M}_1 \approx h_1 h_1^H + g_1 g_1^H + \Lambda. \end{cases} \quad \text{EQ 14}$$

The combining weight vectors obtained with these data covariance matrix estimates are matched to the received data signal structure shown in EQ 11. Superior UE device receiver performance can hence be achieved by utilizing the processes disclosed herein.

In the case that the inter-cell interfering UE device uses different types of frequency-switch transmit diversity coding as the desired UE device, the following process can be employed. Whether the interfering UE device uses transmit diversity with the specific structure (e.g., PUCCH Format 3) is not generally known to the eNB base station. However, it is an advantage of the present embodiments that the multiple covariance matrix estimation is not sensitive to whether other types of diversity transmissions are used by the interfering UE devices. If it has the specific structure, then the advantages provided by the particular embodiments herein are obtained.

In the case of a different type of frequency-switched transmit diversity coding, and presuming that space orthogonal transmit diversity (SORTD) as described in 3GPP TS 36.211 is used by the interfering UE device, the received data signal can be expressed as:

$$y(i,l) = \begin{cases} x_0(i,l)h_0 + d_0(i,l)g_0 + d_1(i,l)g_1 + v(i,l), & \text{if } i \text{ is even} \\ x_1(i,l)h_1 + d_0(i,l)g_0 + d_1(i,l)g_1 + v(i,l), & \text{if } i \text{ is odd} \end{cases} \quad \text{EQ 15}$$

The main components of the data covariance matrix estimates obtained using only the received data signals can be expressed as:

$$\begin{cases} \hat{M}_0 \approx h_0 h_0^H + g_0 g_0^H + g_1 g_1^H + \Lambda \\ \hat{M}_1 \approx h_1 h_1^H + g_0 g_0^H + g_1 g_1^H + \Lambda, \end{cases} \quad \text{EQ 16}$$

which is matched to the received data signal structure in EQ 15.

In the case that the inter-cell interfering UE device uses a single transmit antenna, the received signal can be expressed as:

$$y(i,l) = \begin{cases} x_0(i,l)h_0 + d_0(i,l)g_0 + v(i,l), & \text{if } i \text{ is even} \\ x_1(i,l)h_1 + d_0(i,l)g_0 + v(i,l), & \text{if } i \text{ is odd} \end{cases} \quad \text{EQ 17}$$

The main components of data covariance matrix estimates obtained using only the received data signals can be found to be:

$$\begin{cases} \hat{M}_0 \approx h_0 h_0^H + g_0 g_0^H + \Lambda \\ \hat{M}_1 \approx h_1 h_1^H + g_0 g_0^H + \Lambda \end{cases} \quad \text{EQ 18}$$

which is matched to the received data signal structure in EQ 17.

It is noted that a data covariance matrix estimated from the received reference signals will not match to any desired and interference signal structures. Therefore, an alternative data covariance matrix estimate based on the received reference signals can be calculated as:

$$\hat{M}_d = \frac{1}{24}\sum_{k=0}^{1}\sum_{i=0}^{11} r(i,k)r(i,k)^H. \qquad \text{EQ 19}$$

The main components of this data covariance matrix estimate can be expressed as:

$$\hat{M}_d \approx h_0 h_0^H + h_1 h_1^H + g_0 g_0^H + g_1 g_1^H + \Lambda. \qquad \text{EQ 20:}$$

This covariance matrix estimate contains powers from both antennas of the desired UE device's signals, which does not match to the received signal model for the desired UE device, regardless of what transmit diversity scheme is used by the inter-cell interfering UE device. The matrix estimate also contains powers from both transmit antennas of the interfering UE device, which does not agree with the interference signal structure when the interfering UE uses the frequency-switched transmit diversity.

In a second example, other PUCCH signals transmitted on the same radio resources from the UE device belonging to the same cell as the desired UE device are considered in addition to inter-cell interference. In this particular embodiment, a process of suppressing interference from an intra-cell interfering UE device is described. A person skilled in the art will recognize that these teachings can be applied similarly to more than one interfering UE device.

Let $u_p(i,k)$ be the reference symbol transmitted on the ith subcarrier during the kth SC-FDMA symbol for RS from transmit antenna p of the intra-cell interfering UE. As illustrated in FIG. 9, i ranges from 0 to 11, and k ranges from 0 to 1 in one slot. The antenna index p ranges from 0 to P−1. Let $f_p$ be a $n_R \times 1$ vector containing the $n_R$ channel coefficients from the pth transmit antenna of the intra-cell interfering UE to the $n_R$ receive antennas. The received reference signal can be expressed as:

$$r(i,k)=s_0(i,k)h_0+s_1(i,k)h_1+u_0(i,k)f_0+u_1(i,k)f_1+t_0(i,k)g_0+t_1(i,k)g_1+v(i,k) \qquad \text{EQ 6:}$$

Let $e_p(i,l)$ be the data symbol transmitted on the ith subcarrier during the lth SC-FDMA symbol for data from transmit antenna p of the inter-cell interfering UE. As illustrated in FIG. 9, i ranges from 0 to 11, and l ranges from 0 to 4 in one slot. The antenna index p ranges from 0 to P−1.

If the intra-cell interfering UE device also applies frequency-switched transmit diversity transmission with the specific structure for PUCCH format 3, the received data signal can be expressed as:

$$y(i,l) = \begin{cases} x_0(i,l)h_0 + e_0(i,l)f_0 + d_0(i,l)g_0 + v(i,l), & \text{if } i \text{ is even} \\ x_1(i,l)h_1 + e_1(i,l)f_1 + d_1(i,l)g_1 + v(i,l), & \text{if } i \text{ is odd} \end{cases} \qquad \text{EQ 7}$$

If the intra-cell interfering UE device applies the space orthogonal transmit diversity (SORTD) to the PUCCH signal, according to 3GPP TS 36.211, the received data signal can be expressed as:

$$y(i,l) = \begin{cases} x_0(i,l)h_0 + e_0(i,l)f_0 + e_1(i,l)f_1 + d_0(i,l)g_0 + v(i,l), & \text{if } i \text{ is even} \\ x_1(i,l)h_1 + e_0(i,l)f_0 + e_1(i,l)f_1 + d_1(i,l)g_1 + v(i,l), & \text{if } i \text{ is odd} \end{cases} \qquad \text{EQ 8}$$

If the intra-cell interfering UE device does not apply transmit diversity transmission, the received data signal can be expressed as:

$$y(i,l) = \begin{cases} x_0(i,l)h_0 + e_0(i,l)f_0 + d_0(i,l)g_0 + v(i,l), & \text{if } i \text{ is even} \\ x_1(i,l)h_1 + e_0(i,l)f_0 + d_1(i,l)g_1 + v(i,l), & \text{if } i \text{ is odd} \end{cases} \qquad \text{EQ 9}$$

Since the reference symbols transmitted from the intra-cell interfering UE device are known at the eNB base station, the channel coefficients from the pth transmit antenna of the intra-cell interfering UE device to the $n_R$ receive antennas can be estimated as:

$$\hat{f}_p = \frac{1}{24}\sum_{k=0}^{1}\sum_{i=0}^{11} u_p^*(i,k)r(i,k). \qquad \text{EQ 21}$$

The data covariance matrix estimation procedures disclosed herein can be modified to handle circumstances involving a variety of transmit diversity coding and numbers of transmit antennas. In each case, the resulting data covariance matrix estimates can then be applied in EQ 12 and EQ 13 to compute the combined signals. For example, in the case that the intra-cell interfering UE device uses the same frequency-switched transmit coding as the desired UE device, the $n_R \times n_R$ data covariance matrix $\hat{M}_p$ for the pth transmit antenna is estimated as:

$$\begin{cases} \hat{M}_0 = \left(\frac{1}{30}\sum_{l=0}^{4}\sum_{i=0}^{5} y(2i,l)y^H(2i,l)\right) - f_0 f_0^H \\ \hat{M}_1 = \left(\frac{1}{30}\sum_{l=0}^{4}\sum_{i=0}^{5} y(2i+1,l)y^H(2i+1,l)\right) - f_1 f_1^H \end{cases} \qquad \text{EQ 22}$$

In the case that the intra-cell interfering UE device uses multiple transmit antennas, the $n_R \times n_R$ data covariance matrix $\hat{M}_p$ for the pth transmit antenna is estimated as:

$$\begin{cases} \hat{M}_0 = \left(\frac{1}{30}\sum_{l=0}^{4}\sum_{i=0}^{5} y(2i,l)y^H(2i,l)\right) - f_0 f_0^H - f_1 f_1^H \\ \hat{M}_1 = \left(\frac{1}{30}\sum_{l=0}^{4}\sum_{i=0}^{5} y(2i+1,l)y^H(2i+1,l)\right) - f_0 f_0^H - f_1 f_1^H \end{cases} \qquad \text{EQ 23}$$

In the case that the intra-cell interfering UE device uses a single transmit antenna, the $n_R \times n_R$ data covariance matrix $\hat{M}_p$ for the pth transmit antenna is estimated as:

$$\begin{cases} \hat{M}_0 = \left(\frac{1}{30}\sum_{l=0}^{4}\sum_{i=0}^{5} y(2i,l)y^H(2i,l)\right) - f_0 f_0^H \\ \hat{M}_1 = \left(\frac{1}{30}\sum_{l=0}^{4}\sum_{i=0}^{5} y(2i+1,l)y^H(2i+1,l)\right) - f_0 f_0^H \end{cases} \qquad \text{EQ 24}$$

Utilizing the processes of the particular embodiments disclosed herein, suppression of interfering signals from other cells when, for example, the PUCCH Format 3 with transmit diversity coding is deployed, can be accomplished. Accordingly, superior reception performance of the PUCCH signals can be achieved. Advantageously, the exemplary UE device does not need to know the structure of the transmission of the interfering UE device, and gives enhanced performance in the case the interfering UE device is using the special transmit diversity scheme as is used for the transmission from the desired UE device.

While various embodiments have been described above, it should be understood that they have been presented by way of example only, and not limitation. Thus, the breadth and scope of the present disclosure should not limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

What is claimed is:

1. A method for suppressing interference in a communication network including a plurality of communication devices, comprising:
  receiving, at a communication device, first received signals;
  receiving, at the communication device, second received signals;
  calculating a plurality of estimated channel vectors from the first received signals;
  calculating, using only the second received signals, a plurality of estimated data covariance matrices;
  determining a plurality of combining weight vectors based on the calculated plurality of estimated channel vectors and the calculated plurality of estimated data covariance matrices; and
  combining the second received signals and the plurality of combining weight vectors to obtain a plurality of combined signals,
  wherein interference in the second received signals is suppressed in the plurality of combined signals.

2. The method according to claim 1, wherein the first received signals comprise reference signals and the second received signals comprise data signals.

3. The method according to claim 1, wherein each of the calculated plurality of estimated channel vectors is determined by correlating the first received signals with a reference symbol pattern associated with a transmit antenna over a plurality of resource elements, with each resource element corresponding to a subcarrier of an SC-FDMA symbol.

4. The method according to claim 1, wherein the calculated plurality of estimated channel vectors, $\hat{h}_p$, are determined such that:

$$\hat{h}_p = \frac{1}{24}\sum_{k=0}^{1}\sum_{i=0}^{11} s_p^*(i,k)r(i,k)$$

where $h_p$ is a $n_R \times 1$ vector containing the $n_R$ channel coefficients from the $p^{th}$ transmit antenna of the desired communication device to the $n_R$ receive antennas, $s_p(i,k)$ is the reference symbol transmitted on the $i^{th}$ subcarrier during the $k^{th}$ SC-FDMA symbol for reference signals from transmit antenna p of the desired communication device, $s_p^*(i,k)$ denotes the conjugate of $s_p(i,k)$, and $r(i,k)$ is a $n_R \times 1$ vector containing the $n_R$ received symbols on the $i^{th}$ subcarrier during the $k^{th}$ SC-FDMA symbol for reference signals from the $n_R$ receive antennas.

5. The method according to claim 1, wherein the calculated plurality of estimated data covariance matrices include a first and a second estimated data covariance matrix, wherein the first estimated data covariance matrix is determined based on a first subset of the second received signals and the second estimated data covariance matrix is determined based on a second subset of the second received signals.

6. The method according to claim 5, wherein the first subset of the second received signals includes the second received signals received from even-numbered subcarriers and the second subset of the second received signals includes the second received signals received from odd-numbered subcarriers.

7. The method according to claim 1, wherein the calculated plurality of estimated data covariance matrices, $\hat{M}_p$, are determined such that:

$$\begin{cases} \hat{M}_0 = \dfrac{1}{30}\sum_{l=0}^{4}\sum_{i=0}^{5} y(2i,l)y^H(2i,l) \\ \hat{M}_1 = \dfrac{1}{30}\sum_{l=0}^{4}\sum_{i=0}^{5} y(2i+1,l)y^H(2i+1,l) \end{cases}$$

where $y(i,l)$ is a $n_R \times 1$ vector containing the $n_R$ received symbols on the $i^{th}$ subcarrier during the $l^{th}$ SC-FDMA symbol for data signals from the $n_R$ receive antennas, and $y^H(i,l)$ denotes the conjugate transpose of $y(i,l)$.

8. The method according to claim 5, wherein the plurality of combining weight vectors includes a first and a second combining weight vector, wherein the first combining weight vector is determined based on the first estimated data covariance matrix and an estimated channel vector associated with a first transmit antenna, and the second combining weight vector is determined based on the second estimated data covariance matrix and an estimated channel vector associated with a second transmit antenna.

9. The method according to claim 1, wherein the plurality of combining weight vectors, $w_p$, are determined such that:

$$w_p = \hat{M}_p^{-1}\hat{h}_p$$

for p=0 and 1.

10. The method according to claim 5, wherein the plurality of combined signals includes a first subset and a second subset of combined signals, where the first subset of the combined signals is obtained based on combining the first subset of the second received signals using the combining weight vector, and where the second subset of the combined signals is obtained based on combining the second subset of the second received signals using the combining weight vector.

11. The method according to claim 1, wherein the plurality of combined signals, $\lambda(i,l)$, are determined such that:

$$\lambda(i,l) = \begin{cases} w_0^H y(i,l), & \text{if } i \text{ is even} \\ w_1^H y(i,l), & \text{if } i \text{ is odd} \end{cases}.$$

12. The method according to claim 1, further comprising:
  processing the plurality of combined signals with a despreader to reverse orthogonal cover code (OCC) spreading with cyclic shift as applied to the first and second received signals;

calculating soft values for the coded bits of the processed combined signals;

processing the calculated soft values based on codeword combining and interleaving; and decoding the processed calculated soft values, based on encoding specifications for processing by the communication device.

13. The method according to claim 1, wherein the communication device is a user equipment (UE).

14. The method according to claim 1, wherein the communication device is a base station.

15. A communication device operable in a communication network and structured to suppress interference in received signals, comprising:
a processor;
a memory coupled to the processor;
a transceiver coupled to the processor; and
an antenna coupled to the transceiver configured to transmit and receive signals;
wherein the processor is configured to:
receive first received signals;
receive second received signals;
calculate a plurality of estimated channel vectors from the first received signals;
calculate, using only the second received signals, a plurality of estimated data covariance matrices;
determine a plurality of combining weight vectors based on the calculated plurality of estimated channel vectors and the calculated plurality of estimated data covariance matrices; and
combine the second received signals and the plurality of combining weight vectors to obtain a plurality of combined signals,
wherein interference in the second received signals is suppressed in the plurality of combined signals.

16. The communication device according to claim 15, wherein the first received signals comprise reference signals and the second received signals comprise data signals.

17. The communication device according to claim 15, wherein each of the calculated plurality of estimated channel vectors is determined by correlating the first received signals with a reference symbol pattern associated with a transmit antenna over a plurality of resource elements, with each resource element corresponding to a subcarrier of an SC-FDMA symbol.

18. The communication device according to claim 15, wherein the calculated plurality of estimated channel vectors, $\hat{h}_p$, are determined such that:

$$\hat{h}_p = \frac{1}{24} \sum_{k=0}^{1} \sum_{i=0}^{11} s_p^*(i,k) r(i,k)$$

where $h_p$ is a $n_R \times 1$ vector containing the $n_R$ channel coefficients from the $p^{th}$ transmit antenna of the desired communication device to the $n_R$ receive antennas, $s_p(i,k)$ is the reference symbol transmitted on the $i^{th}$ subcarrier during the $k^{th}$ SC-FDMA symbol for reference signals from transmit antenna p of the desired communication device, $s_p^*(i,k)$ denotes the conjugate of $s_p(i,k)$, and $r(i,k)$ is a $n_R \times 1$ vector containing the $n_R$ received symbols on the $i^{th}$ subcarrier during the $k^{th}$ SC-FDMA symbol for reference signals from the $n_R$ receive antennas.

19. The communication device according to claim 15, wherein the calculated plurality of estimated data covariance matrices includes a first and a second estimated data covariance matrix, wherein the first estimated data covariance matrix is determined based on a first subset of the second received signals, and the second estimated data covariance matrix is determined based on a second subset of the second received signals.

20. The communication device according to claim 19, wherein the first subset of the second received signals includes the second received signals received from even-numbered subcarriers and the second subset of the second received signals includes the second received signals received from odd-numbered subcarriers.

21. The communication device according to claim 15, wherein the calculated plurality of estimated data covariance matrices, $\hat{M}_p$, are determined such that:

$$\begin{cases} \hat{M}_0 = \frac{1}{30} \sum_{l=0}^{4} \sum_{i=0}^{5} y(2i, l) y^H(2i, l) \\ \hat{M}_1 = \frac{1}{30} \sum_{l=0}^{4} \sum_{i=0}^{5} y(2i+1, l) y^H(2i+1, l) \end{cases}$$

where $y(i,l)$ is a $n_R \times 1$ vector containing the $n_R$ received symbols on the $i^{th}$ subcarrier during the $l^{th}$ SC-FDMA symbol for data signals from the $n_R$ receive antennas, and $y^H(i,l)$ denotes the conjugate transpose of $y(i,l)$.

22. The communication device according to claim 19, wherein the plurality of combining weight vectors includes a first and a second combining weight vector, wherein the first combining weight vector is determined based on the first estimated data covariance matrix and an estimated channel vector associated with a first transmit antenna, and the second combining weight vector is determined based on the second estimated data covariance matrix and an estimated channel vector associated with a second transmit antenna.

23. The communication device according to claim 15, wherein the plurality of combining weight vectors, $w_p$, are determined such that:

$$w_p = \hat{M}_p^{-1} \hat{h}_p$$

for p=0 and 1.

24. The communication device according to claim 19, wherein the plurality of combined signals includes a first subset and a second subset of combined signals, wherein the first subset of the combined signals is obtained based on combining the first subset of the second received signals using the combining weight vector, and wherein the second subset of the combined signals is obtained based on combining the second subset of the second received signals using the combining weight vector.

25. The communication device according to claim 15, wherein the plurality of combined signals, $\lambda(i,l)$, are determined by:

$$\lambda(i, l) = \begin{cases} w_0^H y(i, l), & \text{if } i \text{ is even} \\ w_1^H y(i, l), & \text{if } i \text{ is odd} \end{cases}.$$

26. The communication device according to claim 15, wherein the processor is further configured to:
process the plurality of combined signals with a despreader to reverse orthogonal cover code (OCC) spreading with cyclic shift as applied to the first and second received signals;

calculate soft values for the coded bits of the processed combined signals;
process the calculated soft values based on codeword combining and interleaving; and
decode the processed calculated soft values, based on encoding specifications for processing by the communication device.

27. The communication device according to claim 15, wherein the communication device is a user equipment (UE).

28. The communication device according to claim 15, wherein the communication device is a base station.

29. A method for suppressing interference in a communication network including a plurality of communication devices, comprising:
receiving, at a communication device, first received signals;
receiving, at the communication device, second received signals;
calculating a first plurality of estimated channel vectors from the first received signals;
calculating a second plurality of estimated channel vectors from the first received signals;
calculating a plurality of estimated data covariance matrices from the second received signals and the calculated second plurality of estimated channel vectors, and not from the first received signals;
determining a plurality of combining weight vectors based on the calculated first plurality of estimated channel vectors and the calculated plurality of estimated data covariance matrices; and
combining the second received signals and the plurality of combining weight vectors to obtain a plurality of combined signals,
wherein interference in the second received signals is suppressed in the plurality of combined signals.

30. The method according to claim 29, wherein the first received signals comprise reference signals from the desired UE transmitting device and an intra-cell interfering UE device, and the second received signals comprise data signals.

31. The method according to claim 29, wherein each of the calculated plurality of estimated channel vectors is determined by correlating the first received signals with a reference symbol pattern associated with a transmit antenna over a plurality of resource elements, with each resource element corresponding to a subcarrier of an SC-FDMA symbol.

32. The method according to claim 29, wherein the calculated first plurality of estimated channel vectors, $\hat{h}_p$, are determined such that:

$$\hat{h}_p = \frac{1}{24} \sum_{k=0}^{1} \sum_{i=0}^{11} s_p^*(i,k) r(i,k)$$

where $h_p$ is a $n_R \times 1$ vector containing the $n_R$ channel coefficients from the $p^{th}$ transmit antenna of the desired communication device to the $n_R$ receive antennas, $s_p(i,k)$ is the reference symbol transmitted on the $i^{th}$ subcarrier during the $k^{th}$ SC-FDMA symbol for reference signals from transmit antenna p of the desired communication device, $s_p^*(i,k)$ denotes the conjugate of $s_p(i,k)$, and $r(i,k)$ is a $n_R \times 1$ vector containing the $n_R$ received symbols on the $i^{th}$ subcarrier during the $k^{th}$ SC-FDMA symbol for reference signals from the $n_R$ receive antennas.

33. The method according to claim 29, wherein the calculated second plurality of estimated channel vectors, $\hat{f}_p$, are determined such that:

$$\hat{f}_p = \frac{1}{24} \sum_{k=0}^{1} \sum_{i=0}^{11} u_p^*(i,k) r(i,k)$$

where $f_p$ is a $n_R \times 1$ vector containing the $n_R$ channel coefficients from the $p^{th}$ transmit antenna of the intra-cell interfering communication device to the $n_R$ receive antennas, $u_p(i,k)$ is the reference symbol transmitted on the $i^{th}$ subcarrier during the $k^{th}$ SC-FDMA symbol for reference signals from transmit antenna p of the intra-cell interfering communication device, $u_p^*(i,k)$ denotes the conjugate of $u_p(i,k)$, and $r(i,k)$ is a $n_R \times 1$ vector containing the $n_R$ received symbols on the $i^{th}$ subcarrier during the $k^{th}$ SC-FDMA symbol for reference signals from the $n_R$ receive antennas.

34. The method according to claim 30, wherein the received data signals and the received intra-cell interfering data signals use the same frequency-switch transmit diversity coding, and wherein the calculated plurality of estimated data covariance matrices includes a first and a second estimated data covariance matrix, wherein the first estimated data covariance matrix is determined based on a first subset of the second received signals and said second plurality of estimated channel vectors from a first transmit antenna port, and the second estimated data covariance matrix is determined based on a second subset of the second received signals and said second plurality of estimated channel vectors from a second transmit antenna port.

35. The method according to claim 34, wherein the first subset of the second received signals includes the second received signals received from even-numbered subcarriers, and the second subset of the second received signals includes the second received signals received from odd-numbered subcarriers.

36. The method according to claim 34, wherein the first data covariance matrix is further determined by subtracting the outer product of said second plurality of estimated channel vectors from the first transmit antenna port from the first estimated data covariance matrix based on the first subset of the second received signals.

37. The method according to claim 34, wherein the second data covariance matrix is further determined by subtracting the outer product of said second plurality of estimated channel vectors from the second transmit antenna port from the second estimated data covariance matrix based on the second subset of the second received signals.

38. The method according to claim 30, wherein the received data signals and the received intra-cell interfering data signals use the same frequency-switch transmit diversity coding, and wherein the calculated plurality of estimated data covariance matrices, $\hat{M}_p$, for the $p^{th}$ transmit antenna are determined such that:

$$\begin{cases} \hat{M}_0 = \left(\frac{1}{30} \sum_{l=0}^{4} \sum_{i=0}^{5} y(2i,l) y^H(2i,l)\right) - f_0 f_0^H \\ \hat{M}_1 = \left(\frac{1}{30} \sum_{l=0}^{4} \sum_{i=0}^{5} y(2i+1,l) y^H(2i+1,l)\right) - f_1 f_1^H \end{cases}$$

where $y(i,l)$ is a $n_R \times 1$ vector containing the $n_R$ received symbols on the $i^{th}$ subcarrier during the $l^{th}$ SC-FDMA symbol for data signals from the $n_R$ receive antennas, and $y^H(i,l)$ denotes the conjugate transpose of $y(i,l)$.

39. The method according to claim 30, wherein the received intra-cell interfering data signals are transmitted from multiple transmit antennas, and wherein the calculated plurality of estimated data covariance matrices includes a first and a second estimated data covariance matrix, wherein the first estimated data covariance matrix is determined based on a first subset of the second received signals and said second plurality of estimated channel vectors, and the second estimated data covariance matrix is determined based on a second subset of the second received signals and said second plurality of estimated channel vectors.

40. The method according to claim 39, wherein the first subset of the second received signals includes the second received signals received from even-numbered subcarriers, and the second subset of the second received signals includes the second received signals received from odd-numbered subcarriers.

41. The method according to claim 39, wherein the first estimated data covariance matrix is further determined by subtracting a multiplicity of outer products of said second plurality of estimated channel vectors from the first estimated data covariance matrix based on the first subset of the second received signals.

42. The method according to claim 39, wherein the second estimated data covariance matrix is further determined by subtracting a multiplicity of outer products of said second plurality of estimated channel vectors from the second estimated data covariance matrix based on the second subset of the second received signals.

43. The method according to claim 30, wherein the received intra-cell interfering data signals are transmitted from multiple transmit antennas, and wherein the calculated plurality of estimated data covariance matrices, $\hat{M}_p$, for the $p^{th}$ transmit antenna are determined such that:

$$\begin{cases} \hat{M}_0 = \left(\frac{1}{30}\sum_{l=0}^{4}\sum_{i=0}^{5} y(2i,l)y^H(2i,l)\right) - f_0 f_0^H - f_1 f_1^H \\ \hat{M}_1 = \left(\frac{1}{30}\sum_{l=0}^{4}\sum_{i=0}^{5} y(2i+1,l)y^H(2i+1,l)\right) - f_0 f_0^H - f_1 f_1^H. \end{cases}$$

44. The method according to claim 30, wherein the received intra-cell interfering data signals are transmitted from a single transmit antenna, and wherein the calculated plurality of estimated data covariance matrices includes a first and a second estimated data covariance matrix, wherein the first estimated data covariance matrix is determined based on a first subset of the second received signals and said second plurality of estimated channel vectors, and the second estimated data covariance matrix is determined based on a second subset of the second received signals and said second plurality of estimated channel vectors.

45. The method according to claim 44, wherein the first subset of the second received signals includes the second received signals received from even-numbered subcarriers, and the second subset of the second received signals includes the second received signals received from odd-numbered subcarriers.

46. The method according to claim 44, wherein the first estimated data covariance matrix is further determined by subtracting the outer product of said second plurality of estimated channel vectors from the first estimated data covariance matrix based on the first subset of the second received signals.

47. The method according to claim 44, wherein the second estimated data covariance matrix is further determined by subtracting the outer product of said second plurality of estimated channel vectors from the second estimated data covariance matrix based on the second subset of the second received signals.

48. The method according to claim 30, wherein the received intra-cell interfering data signals are transmitted from a single transmit antenna, and wherein the calculated plurality of estimated data covariance matrices, $\hat{M}_p$, for the $p^{th}$ transmit antenna are determined such that:

$$\begin{cases} \hat{M}_0 = \left(\frac{1}{30}\sum_{l=0}^{4}\sum_{i=0}^{5} y(2i,l)y^H(2i,l)\right) - f_0 f_0^H \\ \hat{M}_1 = \left(\frac{1}{30}\sum_{l=0}^{4}\sum_{i=0}^{5} y(2i+1,l)y^H(2i+1,l)\right) - f_0 f_0^H. \end{cases}$$

49. The method according to claim 34, wherein the plurality of combining weight vectors includes a first and a second combining weight vector, wherein the first combining weight vector is determined based on the first estimated data covariance matrix and an estimated channel vector associated with a first transmit antenna, and the second combining weight vector is determined based on the second estimated data covariance matrix and an estimated channel vector associated with a second transmit antenna.

50. The method according to claim 29, wherein the plurality of combining weight vectors, $w_p$, are determined such that:

$$w_p = \hat{M}_p^{-1} \hat{h}_p$$

for p=0 and 1.

51. The method according to claim 34, wherein the plurality of combined signals includes a first subset and a second subset of combined signals, wherein the first subset of the combined signals is obtained based on combining the first subset of the second received signals using the combining weight vector, and wherein the second subset of the combined signals is obtained based on combining the second subset of the second received signals using the combining weight vector.

52. The method according to claim 29, wherein the plurality of combined signals, $\lambda(i,l)$, are determined such that:

$$\lambda(i,l) = \begin{cases} w_0^H y(i,l), & \text{if } i \text{ is even} \\ w_1^H y(i,l), & \text{if } i \text{ is odd} \end{cases}.$$

53. The method according to claim 29, further comprising:
processing the plurality of combined signals with a despreader to reverse orthogonal cover code (OCC) spreading with cyclic shift as applied to the first and second received signals;
calculating soft values for the coded bits of the processed combined received signals;
processing the calculated soft values based on codeword combining and interleaving; and
decoding the processed calculated soft values, based on encoding specifications for processing by the plurality of communication devices.

54. The method according to claim 29, wherein the communication device is a user equipment (UE).

55. The method according to claim 29, wherein the communication device is a base station.

56. A communication device operable in a communication network and structured to suppress interference in received signals, comprising:
a processor;
a memory coupled to the processor;
a transceiver coupled to the processor; and
an antenna coupled to the transceiver configured to transmit and receive signals;
wherein the processor is configured to:
receive first received signals;
receive second received signals;
calculate a first plurality of estimated channel vectors from the first received signals;
calculate a second plurality of estimated channel vectors from the first received signals;
calculate a plurality of estimated data covariance matrices from the second received signals and the calculated second plurality of estimated channel vectors, and not from the first received signals;
determine a plurality of combining weight vectors based on the calculated first plurality of estimated channel vectors and the calculated plurality of estimated data covariance matrices; and
combine the second received signals and the plurality of combining weight vectors to obtain a plurality of combined signals,
wherein interference in the second received signals is suppressed in the plurality of combined signals.

57. The communication device according to claim 56, wherein the first received signals comprise reference signals from the desired UE transmitting device and an intra-cell interfering UE device and the second received signals comprise data signals.

58. The communication device according to claim 56, wherein each of the calculated plurality of estimated channel vectors is determined by correlating the first received signals with a reference symbol pattern associated with a transmit antenna over a plurality of resource elements, with each resource element corresponding to a subcarrier of an SC-FDMA symbol.

59. The communication device according to claim 56, wherein the calculated first plurality of estimated channel vectors, $\hat{h}_p$, are determined such that:

$$\hat{h}_p = \frac{1}{24} \sum_{k=0}^{1} \sum_{i=0}^{11} s_p^*(i,k) r(i,k)$$

where $h_P$ is a $n_R \times 1$ vector containing the $n_R$ channel coefficients from the $p^{th}$ transmit antenna of the desired communication device to the $n_R$ receive antennas, $s_p(i,k)$ is the reference symbol transmitted on the $i^{th}$ subcarrier during the $k^{th}$ SC-FDMA symbol for reference signals from transmit antenna p of the desired communication device, $s^*_p(i,k)$ denotes the conjugate of $s_p(i,k)$, and $r(i,k)$ is a $n_R \times 1$ vector containing the $n_R$ received symbols on the $i^{th}$ subcarrier during the $k^{th}$ SC-FDMA symbol for reference signals from the $n_R$ receive antennas.

60. The communication device according to claim 56, wherein the calculated second plurality of estimated channel vectors, $\hat{f}_p$, are determined such that:

$$\hat{f}_p = \frac{1}{24} \sum_{k=0}^{1} \sum_{i=0}^{11} u_p^*(i,k) r(i,k)$$

where $f_p$ is a $n_R \times 1$ vector containing the $n_R$ channel coefficients from the $p^{th}$ transmit antenna of the intra-cell interfering communication device to the $n_R$ receive antennas, $u_p(i,k)$ is the reference symbol transmitted on the $i^{th}$ subcarrier during the $k^{th}$ SC-FDMA symbol for reference signals from transmit antenna p of the intra-cell interfering communication device, $u^*_p(i,k)$ denotes the conjugate of $u_p(i,k)$, and $r(i,k)$ is a $n_R \times 1$ vector containing the $n_R$ received symbols on the $i^{th}$ subcarrier during the $k^{th}$ SC-FDMA symbol for reference signals from the $n_R$ receive antennas.

61. The communication device according to claim 57, wherein the received data signals and the received intra-cell interfering data signals use the same frequency-switch transmit diversity coding, and wherein the calculated plurality of estimated data covariance matrix includes a first and a second estimated data covariance matrices, wherein the first estimated data covariance matrix is determined based on a first subset of the second received signals and said second plurality of estimated channel vectors from a first transmit antenna port, and the second estimated data covariance matrix is determined based on a second subset of the second received signals and said second plurality of estimated channel vectors from a second transmit antenna port.

62. The communication device according to claim 61, wherein the first subset of the second received signals includes the second received signals received from even-numbered subcarriers, and the second subset of the second received signals includes the second received signals received from odd-numbered subcarriers.

63. The communication device according to claim 61, wherein the first estimated data covariance matrix is further determined by subtracting the outer product of said second plurality of estimated channel vectors from the first transmit antenna port from the first estimated data covariance matrix based on the first subset of the second received signals.

64. The communication device according to claim 61, wherein the second estimated data covariance matrix is further determined by subtracting the outer product of said second plurality of estimated channel vectors from the second transmit antenna port from the second estimated data covariance matrix based on the second subset of the second received signals.

65. The communication device according to claim 57, wherein the received reference signals and the received intra-cell interfering data signals use the same frequency-switch transmit diversity coding, and wherein the calculated plurality of estimated data covariance matrices, $\hat{M}_p$, for the $p^{th}$ transmit antenna are determined such that:

$$\begin{cases} \hat{M}_0 = \left( \frac{1}{30} \sum_{l=0}^{4} \sum_{i=0}^{5} y(2i,l) y^H(2i,l) \right) - f_0 f_0^H \\ \hat{M}_1 = \left( \frac{1}{30} \sum_{l=0}^{4} \sum_{i=0}^{5} y(2i+1,l) y^H(2i+1,l) \right) - f_1 f_1^H \end{cases}$$

where $y(i,l)$ is a $n_R \times 1$ vector containing the $n_R$ received symbols on the $i^{th}$ subcarrier during the $l^{th}$ SC-FDMA symbol for data signals from the $n_R$ receive antennas, and $y^H(i,l)$ denotes the conjugate transpose of $y(i,l)$.

66. The communication device according to claim 57, wherein the received intra-cell interfering data signals are transmitted from multiple transmit antennas, and wherein the calculated plurality of estimated data covariance matrices includes a first and a second estimated data covariance matrix, wherein the first estimated data covariance matrix is determined based on a first subset of the second received signals and said second plurality of estimated channel vectors, and the second estimated data covariance matrix is determined based on a second subset of the second received signals and said second plurality of estimated channel vectors.

67. The communication device according to claim 66, wherein the first subset of the second received signals includes the second received signals received from even-numbered subcarriers, and the second subset of the second received signals includes the second received signals received from odd-numbered subcarriers.

68. The communication device according to claim 66, wherein the first estimated data covariance matrix is further determined by subtracting a multiplicity of outer products of said second plurality of estimated channel vectors from the first estimated data covariance matrix based on the first subset of the second received signals.

69. The communication device according to claim 66, wherein the second estimated data covariance matrix is further determined by subtracting a multiplicity of the outer products of said second plurality of estimated channel vectors from the second estimated data covariance matrix based on the second subset of the second received signals.

70. The communication device according to claim 57, wherein the received intra-cell interfering data signals are transmitted from multiple transmit antennas, and wherein the calculated plurality of estimated data covariance matrices, $\hat{M}_p$ for the $p^{th}$ transmit antenna are determined such that:

$$\begin{cases} \hat{M}_0 = \left(\frac{1}{30}\sum_{l=0}^{4}\sum_{i=0}^{5} y(2i, l)y^H(2i, l)\right) - f_0 f_0^H - f_1 f_1^H \\ \hat{M}_1 = \left(\frac{1}{30}\sum_{l=0}^{4}\sum_{i=0}^{5} y(2i+1, l)y^H(2i+1, l)\right) - f_0 f_0^H - f_1 f_1^H. \end{cases}$$

71. The communication device according to claim 57, wherein the received intra-cell interfering data signals are transmitted from a single transmit antenna, and wherein the calculated plurality of estimated data covariance matrices includes a first and a second estimated data covariance matrices, wherein the first estimated data covariance matrix is determined based on a first subset of the second received signals and said second plurality of estimated channel vectors, and the second estimated data covariance matrix is determined based on a second subset of the second received signals and said second plurality of estimated channel vectors.

72. The communication device according to claim 71, wherein the first subset of the second received signals includes the second received signals received from even-numbered subcarriers, and the second subset of the second received signals includes the second received signals received from odd-numbered subcarriers.

73. The communication device according to claim 71, wherein the first estimated data covariance matrix is further determined by subtracting the outer product of said second plurality of estimated channel vectors from the first estimated data covariance matrix based on the first subset of the second received signals.

74. The communication device according to claim 71, wherein the second estimated data covariance matrix is further determined by subtracting the outer product of said second plurality of estimated channel vectors from the second estimated data covariance matrix based on the second subset of the second received signals.

75. The communication device according to claim 57, wherein the received intra-cell interfering data signals are transmitted from a single transmit antenna, and wherein the calculated plurality of estimated data covariance matrices, $\hat{M}_p$, for the $p^{th}$ transmit antenna are determined such that:

$$\begin{cases} \hat{M}_0 = \left(\frac{1}{30}\sum_{l=0}^{4}\sum_{i=0}^{5} y(2i, l)y^H(2i, l)\right) - f_0 f_0^H \\ \hat{M}_1 = \left(\frac{1}{30}\sum_{l=0}^{4}\sum_{i=0}^{5} y(2i+1, l)y^H(2i+1, l)\right) - f_0 f_0^H. \end{cases}$$

76. The communication device according to claim 61, wherein the plurality of combining weight vectors includes a first and a second combining weight vectors, wherein the first combining weight vector is determined based on the first estimated data covariance matrix and an estimated channel vector associated with a first transmit antenna, and the second combining weight vector is determined based on the second estimated data covariance matrix and an estimated channel vector associated with a second transmit antenna.

77. The communication device according to claim 56, wherein the plurality of combining weight vectors, $w_p$, are determined such that:

$$w_p = \hat{M}_p^{-1} \hat{h}_p$$

for p=0 and 1.

78. The communication device according to claim 61, wherein the combined signals include a first subset and a second subset of combined signals, where the first subset of the combined signals is obtained based on combining the first subset of the second received signals using the combining weight vector, and where the second subset of the combined signals is obtained based on combining the second subset of the second received signals using the combining weight vector.

79. The communication device according to claim 56, wherein the plurality of combined signals, $\lambda(i,l)$, are determined such that:

$$\lambda(i, l) = \begin{cases} w_0^H y(i, l), & \text{if } i \text{ is even} \\ w_1^H y(i, l), & \text{if } i \text{ is odd} \end{cases}.$$

80. The communication device according to claim 56, further comprising:
processing the plurality of combined signals with a despreader to reverse orthogonal cover code (OCC) spreading with cyclic shift as applied to the first and second received signals;
calculating soft values for the coded bits of the processed combined received signals;
processing the calculated soft values based on codeword combining and interleaving; and
decoding the processed calculated soft values, based on encoding specifications for processing by the plurality of communication devices.

81. The communication device according to claim 56, wherein the communication device is a user equipment (UE).

82. The communication device according to claim 56, wherein the communication device is a base station.

* * * * *